(«12») United States Patent
Messersmith et al.

(10) Patent No.: US 8,563,117 B2
(45) Date of Patent: Oct. 22, 2013

(54) BIOMIMETIC MODULAR ADHESIVE COMPLEX: MATERIALS, METHODS AND APPLICATIONS THEREFORE

(76) Inventors: Phillip B. Messersmith, Clarendon Hills, IL (US); Haeshin H.L. Lee, Chicago, IL (US); Bruce P. Lee, Madison, WI (US)

( * ) Notice: Subject to any disclaimer, the term of this patent is extended or adjusted under 35 U.S.C. 154(b) by 833 days.

(21) Appl. No.: 11/834,631

(22) Filed: Aug. 6, 2007

(65) Prior Publication Data
US 2008/0169059 A1 Jul. 17, 2008

Related U.S. Application Data

(60) Provisional application No. 60/835,615, filed on Aug. 4, 2006.

(51) Int. Cl.
B32B 3/06 (2006.01)
B32B 3/08 (2006.01)
B32B 38/00 (2006.01)
B05D 5/00 (2006.01)

(52) U.S. Cl.
USPC ........... 428/142; 428/172; 428/343; 156/328; 156/701; 156/714; 156/61; 156/249; 427/207.1; 427/208.6

(58) Field of Classification Search
USPC .......... 428/142, 172, 343; 156/328, 701, 714, 156/61, 249; 427/207.1, 208.6
See application file for complete search history.

(56) References Cited

U.S. PATENT DOCUMENTS

| 4,339,561 A | 7/1982 | Jacquet et al. |
| 4,496,397 A | 1/1985 | Waite |
| 4,585,585 A | 4/1986 | Waite |
| 4,615,697 A | 10/1986 | Robinson |
| 4,687,740 A | 8/1987 | Waite |
| 4,795,436 A | 1/1989 | Robinson |
| 4,808,702 A | 2/1989 | Waite |
| 4,894,060 A * | 1/1990 | Nestegard ..................... 604/391 |
| 4,908,404 A | 3/1990 | Benedict et al. |
| 4,978,336 A | 12/1990 | Capozzi et al. |
| 4,983,392 A | 1/1991 | Robinson |
| 5,015,677 A | 5/1991 | Benedict et al. |
| 5,024,933 A | 6/1991 | Yang et al. |
| 5,030,230 A | 7/1991 | White |
| 5,049,504 A | 9/1991 | Maugh et al. |
| 5,098,999 A | 3/1992 | Yamamoto et al. |

(Continued)

FOREIGN PATENT DOCUMENTS

| WO | 88/03953 | 6/1988 |
| WO | 92/10567 | 6/1992 |

(Continued)

OTHER PUBLICATIONS

Ruibal et al., The structure of the digital setae of lizards. J. Morphology 117, 271-293 (1965).

(Continued)

Primary Examiner — William P Watkins, III

(57) ABSTRACT

Nano-scale or micro-scale adhesive structures comprising an array of nano-fabricated, pillars, the pillars having coated upon, or having disposed on a working surface thereof, a protein-mimetic, marine-adhesive coating. Methods of fabricating the nano-scale pillars, synthesis of the protein-mimetic coating or wet adhesive and application of the adhesive to the pillars are described.

11 Claims, 8 Drawing Sheets

(56) References Cited

U.S. PATENT DOCUMENTS

| | | | |
|---|---|---|---|
| 5,108,923 A | 4/1992 | Benedict et al. | |
| 5,116,315 A | 5/1992 | Capozzi et al. | |
| 5,156,956 A | 10/1992 | Motoki et al. | |
| 5,192,316 A | 3/1993 | Ting | |
| 5,197,973 A | 3/1993 | Pang et al. | |
| 5,202,236 A | 4/1993 | Maugh et al. | |
| 5,202,256 A | 4/1993 | Maugh et al. | |
| 5,225,196 A | 7/1993 | Robinson | |
| 5,242,808 A | 9/1993 | Maugh et al. | |
| 5,260,194 A | 11/1993 | Olson | |
| 5,374,431 A | 12/1994 | Pang et al. | |
| 5,410,023 A | 4/1995 | Burzio | |
| 5,428,014 A | 6/1995 | Labroo et al. | |
| 5,441,743 A * | 8/1995 | McGinniss et al. | 424/407 |
| 5,487,739 A | 1/1996 | Aebischer et al. | |
| 5,490,980 A | 2/1996 | Richardson et al. | |
| 5,520,727 A | 5/1996 | Vreeland et al. | |
| 5,525,336 A | 6/1996 | Green et al. | |
| 5,549,904 A | 8/1996 | Juergensen et al. | |
| 5,563,047 A | 10/1996 | Petersen | |
| 5,574,134 A | 11/1996 | Waite | |
| 5,580,697 A | 12/1996 | Keana et al. | |
| 5,582,955 A | 12/1996 | Keana et al. | |
| 5,605,938 A | 2/1997 | Roufa et al. | |
| 5,618,551 A | 4/1997 | Tardy et al. | |
| 5,628,793 A | 5/1997 | Zirm | |
| 5,705,177 A | 1/1998 | Roufa et al. | |
| 5,705,178 A | 1/1998 | Roufa et al. | |
| 5,736,132 A | 4/1998 | Juergensen et al. | |
| 5,776,747 A | 7/1998 | Schinstine et al. | |
| 5,800,828 A | 9/1998 | Dionne et al. | |
| 5,817,470 A | 10/1998 | Burzio et al. | |
| 5,830,539 A | 11/1998 | Yan et al. | |
| 5,834,232 A | 11/1998 | Bishop et al. | |
| 5,858,747 A | 1/1999 | Schinstine et al. | |
| 5,935,849 A | 8/1999 | Schinstine et al. | |
| 5,939,385 A | 8/1999 | Labroo et al. | |
| 5,955,096 A | 9/1999 | Santos et al. | |
| 5,968,568 A | 10/1999 | Kuraishi et al. | |
| 5,985,312 A | 11/1999 | Jacob et al. | |
| 5,994,325 A | 11/1999 | Roufa et al. | |
| 6,010,871 A | 1/2000 | Takahara et al. | |
| 6,020,326 A | 2/2000 | Roufa et al. | |
| 6,022,597 A | 2/2000 | Yan et al. | |
| 6,083,930 A | 7/2000 | Roufa et al. | |
| 6,093,686 A | 7/2000 | Nakada et al. | |
| 6,129,761 A | 10/2000 | Hubbell | |
| 6,150,461 A | 11/2000 | Takei et al. | |
| 6,156,348 A | 12/2000 | Santos et al. | |
| 6,162,903 A | 12/2000 | Trowern et al. | |
| 6,235,313 B1 | 5/2001 | Mathiowitz et al. | |
| 6,267,957 B1 | 7/2001 | Green et al. | |
| 6,284,267 B1 | 9/2001 | Aneja | |
| 6,294,187 B1 | 9/2001 | Boyce et al. | |
| 6,306,993 B1 | 10/2001 | Rothbard et al. | |
| 6,309,669 B1 | 10/2001 | Setterstrom et al. | |
| 6,322,996 B1 | 11/2001 | Sato et al. | |
| 6,325,951 B1 | 12/2001 | Soper et al. | |
| 6,331,422 B1 | 12/2001 | Hubbell et al. | |
| 6,335,430 B1 | 1/2002 | Qvist | |
| 6,365,187 B2 | 4/2002 | Mathiowitz et al. | |
| 6,368,586 B1 | 4/2002 | Jacob et al. | |
| 6,417,173 B1 | 7/2002 | Roufa et al. | |
| 6,486,213 B1 | 11/2002 | Chen et al. | |
| 6,491,903 B1 | 12/2002 | Forster et al. | |
| 6,497,729 B1 | 12/2002 | Moussy et al. | |
| 6,506,577 B1 * | 1/2003 | Deming et al. | 435/68.1 |
| 6,555,103 B2 | 4/2003 | Leukel et al. | |
| 6,565,960 B2 | 5/2003 | Koob et al. | |
| 6,566,074 B1 | 5/2003 | Goetinck | |
| 6,566,406 B1 | 5/2003 | Pathak et al. | |
| 6,635,274 B1 | 10/2003 | Masiz et al. | |
| 6,663,883 B1 | 12/2003 | Akiyama et al. | |
| 6,686,026 B2 * | 2/2004 | Spiewak et al. | 428/167 |
| 6,821,530 B2 | 11/2004 | Koob et al. | |
| 6,887,845 B2 | 5/2005 | Barron et al. | |
| 7,009,034 B2 | 3/2006 | Pathak et al. | |
| 7,208,171 B2 | 4/2007 | Messersmith et al. | |
| 7,300,991 B2 | 11/2007 | Nishimura et al. | |
| 2001/0043940 A1 | 11/2001 | Boyce et al. | |
| 2001/0049400 A1 | 12/2001 | Alli et al. | |
| 2002/0022013 A1 | 2/2002 | Leukel et al. | |
| 2002/0049290 A1 | 4/2002 | Vanderbilt | |
| 2002/0182633 A1 | 12/2002 | Chen et al. | |
| 2003/0009235 A1 | 1/2003 | Manrique et al. | |
| 2003/0012734 A1 | 1/2003 | Pathak et al. | |
| 2003/0039676 A1 | 2/2003 | Boyce et al. | |
| 2003/0065060 A1 | 4/2003 | Qvist et al. | |
| 2003/0069205 A1 | 4/2003 | Roufa et al. | |
| 2003/0087338 A1 | 5/2003 | Messersmith et al. | |
| 2003/0099682 A1 | 5/2003 | Moussy et al. | |
| 2003/0109587 A1 | 6/2003 | Mori | |
| 2003/0208888 A1 | 11/2003 | Fearing et al. | |
| 2004/0005421 A1 | 1/2004 | Gervase et al. | |
| 2004/0028646 A1 | 2/2004 | Gross et al. | |
| 2004/0067339 A1 * | 4/2004 | Gandon et al. | 428/141 |
| 2004/0071870 A1 * | 4/2004 | Knowles et al. | 427/200 |
| 2004/0206267 A1 * | 10/2004 | Sambasivan et al. | 106/15.05 |
| 2005/0032929 A1 | 2/2005 | Greener | |
| 2005/0288398 A1 * | 12/2005 | Messersmith et al. | 524/17 |
| 2006/0009550 A1 | 1/2006 | Messersmith et al. | |
| 2011/0021965 A1 * | 1/2011 | Karp et al. | 602/54 |

FOREIGN PATENT DOCUMENTS

| | | |
|---|---|---|
| WO | 94/28937 | 12/1994 |
| WO | 97/34016 | 9/1997 |
| WO | 98/07076 | 2/1998 |
| WO | 196 43 007 A1 | 4/1998 |
| WO | 01/44401 A1 | 6/2001 |
| WO | 02/34764 A1 | 5/2002 |
| WO | 03/008376 A2 | 1/2003 |
| WO | 03/080137 A1 | 10/2003 |
| WO | 2004/042068 A2 | 5/2004 |

OTHER PUBLICATIONS

Geim et al., Microfabricated adhesive mimicking gecko foot-hair. Nat. Materials 2, 461-463 (2003).

Northen et al., A batch fabricated biomimetic dry adhesive. Nanotechnology 16, 1159-1166 (2005).

Sitti et al., Synthetic gecko foot-hair micro/nano-structures as dry adhesives. J. Adhes. Sci. Technol. 17, 1055-1073 (2003).

Yurdumakan et al., A. Synthetic gecko foot-hairs from multiwalled carbon nanotubes. Chem. Commun. 30, 3799-3801 (2005).

Peressadko et al., When less is more: Experimental evidence for tenacity enhancement by division of contact area. J. Adhesion 80, 1-5 (2004).

Crosby et al., A. Controlling polymer adhesion with "Pancakes". Langmuir 21, 11738-11743 (2005).

Northen et al., Meso-scale adhesion testing of integrated micro- and nano-scale structures. Sensors and Actuators A 130-131, 583-587 (2006).

Huber et al., Evidence for capillary contributions to gecko adhesion from single spatula nanomechanical measurements. Proc. Nat. Acad. Sci. USA 102, 16293-16296 (2005).

Sun et al., The nature of the gecko lizard adhesive force. Biophys. J. 89, L14-16 (2005).

Autumn et al., Evidence for van der Weals adhesion in gecko setae. Proc. Nat. Acad. Sci. USA 99, 12252-12256 (2002).

Autumn et al., Adhesive force of a single gecko foot-hair. Nature 405, 681-685 (2000).

Huber et al., Resolving the nanoscale adhesion of individual gecko spatulae by atomic force microscopy. Biology Lett. 1, 2 (2005).

Arzt et al., From micro to nano contacts in biological attachment devices. Proc. Nat. Acad. Sci. USA 100, 10603-10606 (2003).

Arzt, Biological and artificial attachment devices: Lessons for materials scientists from flies and geckos. Materials Sci. and Eng. C: Biomimetic and Supremol. Systems 26, 1245-1250 (2006).

Spolenak et al., Adhesion design maps for bio-inspired attachment systems. Acta biomaterialia 1, 5-13 (2005).

(56) References Cited

OTHER PUBLICATIONS

Waite, Nature's underwater adhesive specialist. Int. J. Adhesion & Adhesives 7, 9 (1987).
Waite, Adhesion a la moule. Integ and Comp. Biol. 42, 1172-1180 (2002).
Waite et al., Polyphenolic substance of *Mytilus edulis*: novel adhesive containing L-Dopa and hydroxyproline. Science 212, 1038-1040 (1981).
Papov et al., Hydroxyarginine-containing polyphenolic proteins in the adhesive plaques of the marine mussel *Mytilus edulis*. J. Biol. Chem. 270, 20183-92 (1995).
Waite, Polyphenolic phosphoprotein from the adhesive pads of the common mussel. Biochemistry 40, 2887-2893 (2001).
Yu et al., J. Synthetic polypeptide mimics of marine adhesives. Macromolecules 31, 4739-4745 (1998).
Frank et al., Adhesion of *Mytilus edulis* Foot Protein 1 on Silica: Ionic Effects on Biofouling. Biotech. Prog. 18, 580-586 (2002).
Hwang et al., J. Expression of functional recombinant mussel adhesive protein Mgfp-5 in *Escherichia coli*. Appl. Environ. Microbiol. 70, 3352-9 (2004).
Lee et al., Rapid Gel Formation and Adhesion in Photocurable and Biodegradable Block Copolymers with High DOPA Content. Macromolecules 39, 1740-1748 (2006).
Lee et al., Single molecule mechanics of mussel adhesion. Proc. Nat. Acad. Sci. USA 103, 12999-13003 (2006).
Whitesides, The origins and the future of microfluidics. Nature 442, 368-373 (2006).
Waite et al., Mussel adhesion: finding the tricks worth mimicking. J. Adhesion 81, 1-21 (2005).
Dalsin et al., Mussel adhesive protein mimetic polymers for the preparation of nonfouling surfaces. J. Am. Chem. Soc. 125, 4253-4258 (2003).
Hutter et al., J. Calibration of atomic-force microscope tips. Rev. Sci. Instr. 64, 1868-1873 (1993).
Advincula, "Surface Initiated Polymerization from Nanoparticle Surfaces," *J. Dispersion Sci. Technol.*, vol. 24, Nos. 3 & 4 (2003), pp. 343-361.
Ahmed, et al., "Synthesis and Application of Fluorescein-Labeled Pluronic Block Copolymers to the Study of Polymer-Surface Interactions," *Langmuir*, vol. 17, No. 2 (2001), pp. 537-546.
Alexandridis, P.; Nivaggioli, T.; Hatton, T. A., "Temperature Effects on Structural Properties of Pluronic P104 and F108 PEO-PPO-PEO Block Copolymer Solutions," *Langmuir*, vol. 11, No. 5 (1995), pp. 1468-1476.
Alexandridis, P., "Poly(ethylene oxide)-Poly(propylene oxide) Block Copolymer Surfactants," *Curr. Opin. Colloid Interface Sci.*, vol. 2, No. 5 (1997), pp. 478-489.
Alivisatos, P., "The use of nanocrystals in biological detection," *Nature Biotechnology*, vol. 22, No. 1 (2004), pp. 47-52.
Alleyne, Jr., et al., "Efficacy and biocompatibility of a photopolymerized, synthetic, absorbable hydrogel as a dural sealant in a canine craniotomy model," *J. Neurosurg.*, vol. 88 (1998), pp. 308-313.
Andreopoulos, et al., "Light-induced tailoring of PEG-hydrogel properties," *Biomaterials*, vol. 19 (1998), pp. 1343-1352.
Andrzejewska, et al., "The role of oxygen in camphorquinone-initiated photopolymerization," *Macromol. Chem. Phys.*, vol. 199 (1998), pp. 441-449.
Araujo, et al., "Interaction of Catechol and Gallic Acid with Titanium Dioxide in Aqueous Suspensions. 1. Equilibrium Studies," *Langmuir*, vol. 21 (2005), pp. 3470-3474.
Armstrong et al., "Scanning Microcalorimetric Investigations of Phase Transitions in Dilute Aqueous Solutions of Poly(oxypropylene)," J. Phys. Chem., vol. 99 (1995), pp. 4590-4598.
Arnow, "Colorimetric Determination of the Component of 3, 4-Dihydroxyphemylalanine-Tyrosine Mixtures," *J. Biol. Chem.*, vol. 118 (1937), pp. 531-538.
Arzt et al., "From micro to nano contacts in biological attachment devices," *Proc. Nat. Acad. Sci. USA*, vol. 100 (2003), pp. 10603-10606.
Arzt, "Biological and artificial attachment devices: Lessons for materials scientists from flies and geckos," *Mater. Sci. Eng. C*, vol. 26 (2006), pp. 1245-1250.
Autumn et al., "Adhesive force of a single gecko foot-hair," *Nature*, vol. 405 (2000), pp. 681-685.
Autumn et al., "Evidence for van der Waals adhesion in gecko setae," *Proc. Nat. Acad. Sci. USA*, vol. 99 (2002), pp. 12252-12256.
Baird, et al. (2007), "Reduction of Incisional Cerebrospinal Fluid Leak Following Posterior Foss Surgery with the use of Duraseal," American Association of Neurosurgeons. Abstract retrieved Jul. 23, 2008, from AANS Abstract Center database. Available from: http://www.aans.org/library/article.aspx?ArticleId=42392.
Balsa-Canto, et al., "Reduced-Order Models for Nonlinear Distributed Process Systems and Their Application in Dynamic Optimization," *Ind. Eng. Chem. Res.*, vol. 43 (2004), pp. 3353-3363.
Banerjee, et al., "Derivatives of 3, 4-Dihydroxyphenylalanine for Peptide Synthesis," *J. Org. Chem.*, vol. 41, No. 18 (1976), pp. 3056-3058.
Barbakadze, et al., "Poly[3-(3, 4-dihydroxyphenyl)glyceric Acid], A New Biologically Active Polymer from *Symphytum Asperum Lepech*. and *S. Caucasicum Bieb*. (Boraginaceae)," *Molecules*, vol. 10 (2005), pp. 1135-1144.
Barichello et al., "Absorption of insulin from Pluronic F-127 gels following subcutaneous administration in rats," *Int. J. Pharm.*, vol. 184 (1999), pp. 189-198.
Benedek, "End Uses of Pressure-Sensitive Products" in *Developments in Pressure-Sensitive Products*, Benedek (ed.), CRC Press: Boca Raton, FL (2006). pp. 539-596.
Bharathi, et al., "Direct synthesis of gold nanodispersions in sol-gel derived silicate sols, gels and films," *Chem. Commun.* (1997), pp. 2303-2304.
Bontempo, et al., "Atom Transfer Radical Polymerization as a Tool for Surface Functionalization," *Adv. Mater.*, vol. 14, No. 17 (2002), pp. 1239-1241.
Boogaarts, et al., "Use of a novel absorbable hydrogel for augmentation of dural repair: results of a preliminary clinical study," *Neurosurg.*, vol. 57 (2005), pp. 146-151.
Bromberg, "Novel Family of Thermogelling Materials via C—C Bonding between Poly(acrylic acid) and Poly(ethylene oxide)-b-poly(propylene oxide)-b-poly(ethylene oxide)," *J. Phys. Chem. B*, vol. 102 (1998), pp. 1956-1963.
Bromberg, "Self-Assembly in Aqueous Solutions of Polyether-Modified Poly(acrylic acid)," *Langmuir*, vol. 14 (1998), pp. 5806-5812.
Bromberg, "Temperature-responsive gels and thermogelling polymer matrices for protein and peptide delivery," *Advanced Drug Reviews*, vol. 31 (1998), pp. 197-221.
Brown, et al., "Micelle and Gel Formation in a Poly(ethylene oxide)/Poly(propylene oxide)/Poly(ethylene oxide) Triblock Copolymer in Water Solution. Dynamic and Static Light Scattering and Oscillatory Shear Measurements," *J. Phys. Chem.*, vol. 95 (1991), pp. 1850-1858.
Bruinsma, et al., "Bacterial adhesion to surface hydrophilic and hydrophobic contact lenses," *Biomaterials*, vol. 22 (2001), pp. 3217-3224.
Bryant, et al., "Cytocompatibility of UV and visible light photoinitiating systems on cultured NIH/3T3 fobroblasts in vitro," *J. Biomater. Sci. Polymer Edn*, vol. 11, No. 5 (2000), pp. 439-457.
Burdick, et al., "Synthesis and Characterization of Tetrafunctional Lactic Acid Oligomers: A potential In Situ Forming Degradable Orthopaedic Biomaterial," *J. Polym. Sci., Part A: Polym. Chem.*, vol. 39 (2001), pp. 683-692.
Burzio, et al., "Cross-Linking in Adhesive Quinoproteins: Studies with Model Decapeptides," *Biochemistry*, vol. 39 (2000), pp. 11147-11153.
Cabana, et al., "Study of the Gelation Process of Polyethylene Oxide$_a$—Polypropylene Oxide$_b$—Polyethylene Oxide$_a$ Copolymer (Poloxamer 407) Aqueous Solutions," *J. Colloid Interface Sci.*, vol. 190 (1997), pp. 307-312.
Campbell, et al., "Evaluation of Absorbable Surgical Sealants: In vitro Testing, Confluent Surgical, Inc. (2005) White Paper." Available from: http://www.confluentsurgical.com/pdf/ds/6070_DuraSeal_Invitro_WP13-25.pdf.

(56) References Cited

OTHER PUBLICATIONS

Carmichael, et al., "Selective Electroless Metal Deposition Using Microcontact Printing of Phosphine—Phosphonic Acid Inks," *Langmuir*, vol. 20 (2004), pp. 5593-5598.

Chalykh, et al., "Pressure-Sensitive Adhestion in the Blends of Poly(N-vinyl pyrrolidone) and Poly(ethylene glycol) of Disparate Chain Lengths," *J. of Adhes.*, vol. 78 (2002), pp. 667-694.

Chehimi, et al., "XPS investigations of acid-base interactions in adhesion. Part 3. Evidence for orientation of carbonyl groups from poly(methylmethacrylate) (PMMA) at the PMMA—glass and PMMA—$SiO_2$ interfaces," *J. Electron. Spectrosc. Relat. Phenom.*, vol. 63 (1993), pp. 393-407.

Chen, et al., "Temperature-Induced Gelation Pluronic-g-Poly(acrylic acid) Graft Copolymers for Prolonged Drug Delivery to the Eye," in Harris, et al. (eds.) *Poly(ethylene glycol): Chemistry and Biological Applications*. New York, NY: Oxford University Press USA, 1997. pp. 441-451.

Chen, et al., "Enzymatic Methods for in Situ Cell Entrapment and Cell Release," *Biomacromolecules*, vol. 4 (2003), pp. 1558-1563.

Collier, et al., "Enzymatic Modification of Self-Assembled Peptide Structures with Tissue Transglutaminase," *Bioconjugate Chem.*, vol. 14 (2003), pp. 748-755.

Collier, et al., "Self-Assembling Polymer-Peptide Conjugates: Nanostructural Tailoring," *Adv. Mater.*, vol. 16, No. 11 (2004), pp. 907-910.

Collins, et al., "Use of collagen film as a dural substitute: Preliminary animal studies," *J. Biomed. Mater. Res.*, vol. 25 (1991), pp. 267-276.

Connor, et al., "New Sol—Gel Attenuated Total Reflection Infrared Spectroscopic Method for Analysis of Adsorption at Metal Oxide Surfaces in Aqueous Solutions. Chelation of $TiO_2$, $ZrO_2$, and $Al_2O_3$ Surfaces by Catechol, 8-Quinolinol, and Acetylacetone," *Langmuir*, vol. 11 (1995), pp. 4193-4195.

Cosgrove, et al., "Safety and efficacy of a novel polyethylene glycol hydrogel sealant for watertight dural repair," *J. Neurosurg.*, vol. 106 (2007), pp. 52-58.

Cosgrove, "Safety and Efficacy of a Novel PEG Hydrogel Sealant (DuraSeal®) for Watertight Closure after Dural Repair," Presented at the Congress of Neurological Surgeons 55th Annual Meeting, Boston, MA, Oct. 2005. Available from: http://www.confluentsurgical.com/pdf/ds/CosgroveAbstractCNS2005.pdf.

Crescenzi, et al., "New Gelatin-Based Hydrogels via Enzymatic Networking," *Biomacromolecules*, vol. 3 (2002), pp. 1384-1391.

Creton, "Pressure-Sensitive Adhesives: An Introductory Course," *MRS Bulletin*, vol. 26, No. 6 (2003), pp. 434-439.

Crosby, et al., "Rheological properties and adhesive failure of thin viscoelastic layers," *J. Rheol.*, vol. 46, No. 1 (2002), pp. 273-294.

Crosby, et al., "Controlling Polymer Adhesion with "Pancakes"," *Langmuir*, vol. 21 (2005), pp. 11738-11743.

Cruise, et al., "A Sensitivity Study of the Key Parameters in the Interfacial Photopolymerization of Poly(etheylene glycol) Dlacrylate upon Porcine Islets," *Biotechnol. Bioeng.*, vol. 57, Issue 6 (1998), pp. 655-665.

Dai, et al., "Novel pH-Responsive Amphiphilic Diblock Copolymers with Reversible Micellization Properties," *Langmuir* 19 (2003). pp. 5175-5177.

Dalsin, et al., "Surface Modification for Protein Resistance Using a Biomimetic Approach," *Mat. Res. Soc. Symp. Proc.*, vol. 774 (2002), pp. 75-80.

Dalsin, et al., "Mussel Adhesive Protein Mimetic Polymers for the Preparation of Nonfouling Surfaces," *J. Am. Chem. Soc.* 125 (2003). pp. 4253-4258.

Dalsin, et al., "Antifouling Performance of Poly(ethylene glycol) Anchored onto Surfaces by Mussel Adhesive Protein Mimetic Peptides," *Polymeric Materials Science and Engineering* 90 (2004). pp. 247-248.

Dalsin, et al., "Protein Resistance of Titanium Oxide Surfaces Modified by Biologically Inspired mPEG—DOPA," *Langmuir* 21 (2005). pp. 640-646.

Davis, et al., "Polymeric microspheres as drug carriers," *Biomaterials* 9 (1), 1988. pp. 111-115.

Deible, et al., "Creating molecular barriers to acute platelet deposition on damaged arteries with reactive polyethylene glycol," *J. Biomed. Maters. Res.* 41 (1998). pp. 251-256.

Deming, "Mussel byssus and biomolecular materials," *Current Opinion in Chemical Biology*, 3 (1), 1999. pp. 100-105.

Deming, et al., "Mechanistic Studies of Adhesion and Crosslinking in Marine Adhesive Protein Analogs," *Polym. Mater. Sci. Eng.*, 80 (1999). pp. 471-472.

Deruelle, et al., "Adhesion at the Solid—Elastomer Interface: Influence of the Interfacial Chains," *Macromolecules*, vol. 28 (1995), pp. 7419-7428.

Desai, et al., "In Vitro Evaluation of Pluronic F127-Based Controlled-Release Ocular Delivery Systems for Polocarpine," *J. Phar. Sci.*, 87 (2), 1998. pp. 226-230.

Dillow, et al., "Adhesion of $\oplus_5\beta_1$ receptors to biomimetic substrates constructed from peptide amphiphiles," *Biomaterials*, vol. 22 (2001), pp. 1493-1505.

Donkerwolcke, et al., "Tissue and bone adhesives—historical aspects," *Biomaterials* 19 (1998). pp. 1461-1466.

Dossot, et al., "Role of Phenolic Derivatives in Photopolymerization of an Acrylate Coating," *J. Appl. Polymer. Sci.*, 78 (2000). pp. 2061-2074.

Drumheller, et al., "Polymer Networks with Grafted Cell Adhesion Peptides for Highly Biospecific Cell Adhesive Substrates," *Anal. Biochem.*, vol. 222 (1994), pp. 380-388.

Elbert, et al., "Reduction of fibrous adhesion formation by a copolymer possessing an affinity for anionic surfaces," *J. Biomed. Mater. Res.*, vol. 42, Issue 1 (1998), pp. 55-65.

Elisseeff, et al., "Photoencapsulation of chondrocytes in poly(ethylene oxide)-based semi-interpenetrating networks," *J. Biomed. Mater. Res.*, vol. 51, Issue 2 (2000), pp. 164-171.

Erli, et al., "Surface pretreatments for medical application of adhesion," *BioMed. Eng. Online*, 2 (15), 2003. Available from: http://www.biomedical-engineering-online.com/content/2/2/15.

Fan et al., "Surface-Initiated Polymerization from $TiO_2$ Nanoparticle Surfaces through a Biomimetic Initiator: A New Route toward Polymer-Matrix Composites," *Comp. Sci. Tech.*, 66 (9), 2006. pp. 1195-1201.

Fang, et al., "Effect of Molecular Structure on the Adsorption of Protein on Surfaces with Grafted Polymers," *Langmuir*, vol. 18 (2002), pp. 5497-5510.

Faulkner, et al., "A New Stable Pluronic F68 Gel Carrier for Antibiotics in Contaminated Wound Treatment," *Am. J. Emerg. Med.*, 15 (1), 1997. pp. 20-24.

Feldstein, et al., "Molecular Design of Hydrophilic Pressure-Sensitive Adhesives for Medical Applications," in *Developments in Pressure-Sensitive Products*, I. Benedek (ed.). 2006, CRC Press: Boca Raton, FL. pp. 473-503.

Filpula, et al., "Structural and Functional Repetition in a Marine Mussel Adhesive Protein," *Biotechnol. Prog.* 6 (1990). pp. 171-177.

Fischer, et al., "In vitro cytotoxicity testing of polycations: influence of polymer structure on cell viability and hemolysis," *Biomaterials* 24 (2003). pp. 1121-1131.

Flanigan, et al., "Adhesive and Elastic Properties of Thin Gel Layers," *Langmuir*, vol. 15 (1999), pp. 4966-4974.

Flanigan, et al., "Structural Development and Adhesion of Acrylic ABA Triblock Copolymer Gels," *Macromolecules*, vol. 32 (1999), pp. 7251-7262.

Flood, et al., "Efficient Asymmetric Epoxidation of $\oplus,\beta$-Unstarudated Ketones Using a Soluble Triblock Polyethylene Glycol-Polyamino Acid Catalyst," *Org. Lett.*, vol. 3, No. 5 (2001), pp. 683-686.

Floudas, et al., "Hierarchical Self-Assembly of Poly($y$-benzyl-L-glutamate)—Poly(ethylene glycol)—Poly($y$-benzyl-L-glutamate) Rod—Coil—Rod Triblock Copolymers," *Macromolecules*, vol. 36 (2003), pp. 3673-3683.

Flory, et al., "Effect of volume Exclusion on the Dimensions of Polymer Chains," *J. Chem. Phys.*, vol. 44, No. 6 (1966), pp. 2243-2248.

Floyd-Smith, et al., "Interferon Action: RNA Cleavage Pattern of a (2'-5')Oligoadenylate-Dependent Endonuclease," *Science*, vol. 212, No. 4498 (May 29, 1981), pp. 1030-1032.

(56) References Cited

OTHER PUBLICATIONS

Frank, et al., "Adhesion of *Mytilus edulis*Foot Protein 1 on Silica: Ionic Effects on Biofouling," *Biotechnol. Prog.* 18 (2002). pp. 580-586.

Fuchsbauer, et al., "Influence of gelatin matrices cross-linked with transglutaminase on the properties of an enclosed bioactive material using β-galactosidase as model system," *Biomaterials* 17 (1996). pp. 1481-1488.

Fujisawa, et al., "Kinetic Evaluations of the Reactivity of Flavonoids as Radical Scavengers," *SAR QSAR Environ. Res.*, Vo. 13, No. 6 (2002), pp. 617-627.

Fuller, et al., "A Procedure for the Facile Synthesis of Amino-Acid N-Carboxyanhydrides," *Biopolymers* 15 (1976). pp. 1869-1871.

Fuller, et al., "DOPA-Containing Polypeptides. I. Improved Synthesis of High-Molecular-Weight Poly (L-DOPA) and Water-Soluble Copolypeptides," *Biopolymers* 17 (1978). pp. 2939-2943.

Geim, et al., "Microfabricated adhesive mimicking gecko foot-hair," *Nat. Materials* 2 (2003). pp. 461-463.

Ghosh, et al., "N,N'-Disuccinimidyl Carbonate: A Useful Reagent for Alkoxycarbonylation of Amines," *Tetra. Lett.* 33 (20), 1992. pp. 2781-2784.

Gidanian, et al., "Redox behavior of melanins: direct electrochemistry of dihydroxyindole-melanin and its Cu and Zn adducts," *J. Inorg. Biochem.* 89 (2002). pp. 54-60.

Green, et al., "A surface plasmon resonance study of albumin adssoption to PEO-PPO-PEO triblock copolymers," *J. Biomed. Res.* 42 (1998). pp. 165-171.

Gross, et al., "Amine Bindindg Sites in Acyl Intermediates of Transglutaminases," *J. Biol. Chem.* 242 (11) (1977). pp. 3752-3759.

Grotenhuis, "Costs of postoperative cerebrospinal fluid leakage: 1-year, retrospective analysis of 412 consecutive nontrauma cases," *Surg. Neurol.*, vol. 64, No. 6 (2005), pp. 493-494.

Gu, et al., "Synthesis of Aluminum Oxide/Gradient Copolymer Composites by Atom Transfer Radical Polymerization," *Macromolecules* 35 (2002). pp. 8913-8916.

Gu, et al., "The role of microbial biofilms in deterioration of space station candidate materials," *Int. Biodeterioration Biodegradation* 41 (1998). pp. 25-33.

Guvendiren, et al., "Adhesion in Self-Assembled Hydrogels with High DOPA Content," *Proceedings of the 30th Annual Meeting of the Adhesion Society* (2007).

Guvendiren, et al., "Synthesis and Adhesion Properties of DOPA Incorporated Acrylic Triblock Hydrogels," *Proceedings of the 29th Annual Meeting of the Adhesion Society* (2006). pp. 277-279.

Haemers, et al., "Effect of Oxidation Rate on Cross-Linking of Mussel Adhesive Proteins," *Biomacromolecules*, vol. 4 (2003), pp. 632-640.

Hajjaji, et al., "Effect of N-Alkybetaines on the Corrosion of Iron in 1 M HCl Soluction," *Corrosion*, vol. 49, No. 4 (1993), pp. 326-334.

Hanawa, et al., "XPS Characterization of the Surface Oxide Film of 316L Stainless Steel Samples that were Located in Quasi-Biological Environments," *Mater. Trans., JIM*, vol. 43, No. 12 (2002), pp. 3088-3092.

Hansen, et al., "Enzymatic Tempering of a Mussel Adhesive Protein Film," *Langmuir* 14 (1998). pp. 1139-1147.

Harris, "Laboratory Synthesis of Polyethylene Glycol Derivatives," *JMS—Rev. Macromol. Chem. Phys.*, vol. C25, No. 3 (1985), pp. 325-373.

Harris (ed.), "Introduction to Biotechnical and Biomedical Applications of Poly(Ethylene Glycol)" in *Poly(Ethylene Glycol) Chemistry: Biotechnical and Biomedical Applications*, Plenum Press: New York, 1992. pp. 1-14.

Hennink, et al., "Novel crosslinking methods to design hydrogels," *Adv. Drug Deliver. Rev.*, vol. 54 (2002), pp. 13-36.

Hern, et al., "Incorporation of adhesion peptides into nonadhesive hydrogels useful for tissue resurfacing," *J. Biomed. Mater. Res.*, vol. 39, Issue 2 (1998), pp. 266-276.

Hillery, et al., "The effect of adsorbed poloxamer 188 and 407 surfactants on the intestinal uptake of 60-nm polystyrene particles after oral administratin in the rat," *Int. J. Pharm.* 132 (1996). pp. 123-130.

Ho, et al., "Nanoseparated Polymeric Networks with Multiple Antimicrobial Properties," *Adv. Mater.* 16 (12), 2004. pp. 957-961.

Hoffman, "Hydrogels for biomedical applications," *Adv. Drug Deliver. Rev.*, vol. 43 (2002), pp. 3-12.

Hohenadl, et al., "Two Adjacent N-terminal Glutamines of BM-40 (Osteonectin, SPARC) Act as Amine Acceptor Sites in Transglutaminase$_c$-catalyzed Modification," *J. Biol. Chem.* 270 (40), 1995. pp. 23415-23420.

Hrkach, et al., "Synthesis of Poly(L-lactic acid-*co*-L-lysine) Graft Copolymers," *Macromolecules*, vol. 28 (1995), pp. 4736-4739.

Hu, et al., "Protection of 3,4-dihydroxyphenylalanine (DOPA) for Fmoc solid-phase peptide synthesis," *Tetra. Lett.* 41 (2000). pp. 5795-5798.

Hu, et al., "Rational Design of Transglutaminase Substrate Peptides for Rapid Enzymatic Formation of Hydrogels," *J. Am. Chem. Soc.*, vol. 125, (2003), pp. 14298-14299.

Huang, et al., "Synthesis and Characterization of Self-Assembling Block Copolymers Containing Adhesive Moieties," *Polym. Prepr.* 42 (2), 2001. pp. 147-148.

Huang, et al., "Synthesis and Characterization of Self-Assembling Block Copolymers Containing Bioadhesive End Groups," *Biomacromolecules* 3 (2002). pp. 397-406.

Huang, et al., "Covalent Attachment of Novel Poly(ethylene glycol)—Poly(DL-lactic acid) Copolymeric Micelles to $TiO_2$ Surfaces," *Langmuir* 18 (2002). pp. 252-258.

Huang, et al., "Functionalization of Surfaces by Water-Accelerated Atom-Transfer Radical Polymerization of Hydroxyethyl Methacrylate and Subsequent Derivatization," *Macromolecules* 35 (2002). pp. 1175-1179.

Huang, et al., "Poly(L-lysine)-g-poly(ethylene glycol) Layers on Metal Oxide Surfaces: Surface-Analytical Characterization and Resistance to Serum and Fibrinogen Adsorption," *Langmuir*, vol. 17 (2001), pp. 489-498.

Huang, "Molecular aspects of muco- and bioadhesion: Tethered structures and site-specific surfaces," *J. Controlled Release*, vol. 65 (2000), pp. 63-71.

Huber, et al., "Resolving the nanoscale adhesion of individual gecko spatulae by atomic force microscopy," *Biol. Lett.* 1 (2005). pp. 2-4.

Huber, et al., "Evidence for capillarity contributions to gecko adhesion from single spatula nanomechanical measurements," *Proc. Nat. Acad. Sci. USA*, 102 (45), 2005. pp. 16293-16296.

Huin-Amargier, et al., "New physically and chemically crosslinked hyaluronate (HA)-based hydrogels for cartilage repair," *J. Biomed. Mater. Res.* 76A (2), 2006. pp. 416-424.

Hunter, "Molecular hurdles in polyfectin design and mechanistic background to polycation inducted cytotoxicity," *Adv. Drug Deliver. Rev.*, vol. 58 (2006). pp. 1523-1531.

Hutter, et al., "Calibration of atomic-force microscope tips," *Rev. Sci. Instrum.* 64 (7), Jul. 1993. pp. 1868-1873.

Hvidt, et al., "Micellization and Gelation of Aqueous Solutions of a Triblock Copolymer Studied by Rheological Techniques and Scanning Calorimetry," *J. Phys. Chem.* 98 (1994). pp. 12320-12328.

Hwang, et al., "Expression of Functional Recombinant Mussel Adhesive Protein Mgfp-5 in *Escherichia coli*," *Appl. Environ. Microbiol.* 70 (6), 2004. pp. 3352-3359.

Ikada, "Tissue Adhesives," in *Wound Closure Biomaterials and Devices*, Chu, et al. (eds.), CRC Press, Inc.: Boca Raton, FL, 1997. pp. 317-346.

International Search Report for PCT/US2003/034633; WO 2004/042068 A3 (May 21, 2005); Northwestern University (Applicant); Messersmith, et al. (inventors).

International Search Report for PCT/US2005/006418; WO 2005/118831 A3 (Dec. 15, 2005); Northwestern University (Applicant); Messersmith, et al. (inventors).

International Search Report for PCT/US2005/024642; WO 2006/091226 A3 (Aug. 31, 2006); Northwestern University (Applicant); Messersmith, et al. (inventors).

(56) References Cited

OTHER PUBLICATIONS

International Search Report for PCT/US/2005/041280; WO 2006/055531 A3 (May 26, 2006); Northwestern University (Applicant); Messersmith, et al. (Inventors).
International Search Report for PCT/US2007/075299; WO 2008/019352 A3 (Feb. 14, 2008); Nerites Corporation (Applicant); Lee (Inventor).
International Search Report for PCT/US2002/23005; WO 03/008376 A3 (Jan. 30, 2003); Northerwestern University (Applicant); Messersmith, et al. (inventors).
Ishihara, et al., "Photocrosslinkable chitosan as a dressing wound occlusion and accelerator in healing process," *Biomaterials*, vol. 23, No. 3 (2002), pp. 833-840.
Jackson, "Tissue sealants: Current status, future potential," *Nat. Med.*, vol. 2, No. 5, (May 1996), pp. 637-638.
Jackson, "Fibrin sealants in surgical practice: An overview," *Am. J. Surg.*, vol. 182 (2001), pp. 1S-7S.
Jänchen, et al., "Adhesion Energy of Thin Collagen Coatings and Titanium," *Surf. Interface Anal.*, vol. 27 (1999), pp. 444-449.
Jensen, et al., "Lipopeptides Incorporated into Supported Phospholipid Monolayers Have High Specific Activity at Low Incorporation Levels," *J. Am. Chem. Soc.*, vol. 126, No. 46 (2004), pp. 15223-15230.
Jeon, et al., "Protein-Surface Interactions in the Presence of Polyethylene Oxide," *J. Colloid. Interface Sci.*, vol. 142, No. 1 (1991), pp. 159-166.
Jewell, et al., "Pharmacokinetics of RheothRx Injection in Healthy Male Volunteers," *J. Phar. Sci.* vol. 86, No. 7 (1997), pp. 808-812.
Jo, et al., "Surface modification using silanated poly(ethylene glycol)s," *Biomaterials*, vol. 21 (2000), pp. 605-616.
Johnson, et al., "Surface Energy and Contact of Elastic Solids," *Proc. R. Soc. Lond., A*, vol. 324, No. 1558 (1971), pp. 301-313.
Jones, et al., "Controlled Surface-Initiated Polymerization in Aqueous Media," *Adv. Mater.*, vol. 13, No. 16 (2001), pp. 1256-121259.
Jones, et al., "In Situ forming biomaterials," *Oral Maxillofacial Surg. Clin. N. Am.*, vol. 14 (2002), pp. 29-38.
Kahlem, et al., "Peptides containing glutamine repeats as substrates for transglutaminase-catalyzed cross-linking: Relevance to diseases of the nervous system," *Proc. Natl. Acad. Sci. USA*, vol. 93 (Dec. 1996), pp. 14580-14585.
Kellaway, et al., "Oral Mucosal Drug Delivery," in *Oral Mucosal Drug Delivery*, Rathbone (ed.). 1996, Marcel Dekkers, Inc.: New York, NY. pp. 221-239.
Kenausis, et al., "Poly(L-lysine)-g-Poly(ethylene glycol) Layers on Metal Oxide Surfaces: Attachment Mechanism and Effects on Polymer Architecture on Resistance to Protein Adsoprtion," *J. Phys. Chem. B*, vol. 104 (2000), pp. 3298-3309.
Khudyakov, et al., "Kinetics of Photopolymerization of Acrylates with Functionality of 1-6," *Ind. Eng. Chem. Res.* 38 (1999). pp. 3353-3359.
Kingshott, et al., "Effects of cloud-point grafting, chain length, and density of PEG layers on competitive adsorption of ocular proteins," *Biomaterials* 23 (2002). pp. 2043-2056.
Kirschenbaum, et al., "Sequence-specific polypeptoids: A diverse family of heteropolymers with stable secondary structure," *Proc. Natl. Acad. Sci. USA* 95 (1998). pp. 4303-4308.
Kitano, et al., "Resistance of zwitterionic telomers accumulated on metal surfaces against nonspecific adsorption of proteins," *J. Colloid Interface Sci.* 282 (2005). pp. 340-348.
Klug, et al, "In Situ Analysis of Peptidyl DOPA in Mussel Byssus Using Rotational-Echo Double-Resonance NMR," *Arch. Biochem. Biophys.*, vol. 333, No. 1 (Sep. 1, 1996), pp. 221-224.
Kolb, et al., "Click Chemistry: Diverse Chemical Function from a Few Good Reactions," *Agnew. Chem. Int. Ed.*, vol. 40 (2001), pp. 2005-2021.
Koob, et al., "Mechanical and thermal properties of novel polymerized NDGA-gelatin hydrogels," *Biomaterials*, vol. 24 (2003), pp. 1285-1292.
Korobkova, et al., "From molecular noise to behavioural variability in a single bacterium," *Nature* 428 (2004). pp. 574-578.

Kummert, et al., "The Surface Complexation of Organic Acids of Hydrous $y$-$Al_2O_3$," *J. Colloid Interface Sci.*, vol. 75, No. 2 (Jun. 1980), pp. 373-385.
Laucournet, et al., "Catechol derivatives and anion adsorption onto alumina surfaces in aqueous media: influence on the electrokinetic properties," *J. Eur. Ceram. Soc.* 21 (2001). pp. 869-878.
LaVoie, et al., "Dopamine covalently modifies and functionally inactivates parkin," *Nature Med.* 11 (11), 2005. pp. 1214-1221.
Lee, et al., "Enzymatic and Non-Enzymatic Pathways to Formation of DOPA-Modified PEG Hydrogels," *Polymer Preprints* 42 (2), 2001. pp. 151-152.
Lee, et al., "Synthesis and Gelation of DOPA-Modified Poly(ethylene glycol) Hydrogels," *Biomacromolecules* 3 (2002). pp. 1038-1047.
Lee, et al., "Synthesis of 3,4-dihydroxyphenylalanine (DOPA) containing monomers and their co-polymerizations with PEG-diacrylate to form hydrogels," *J. Biomater. Sci. Polymer Edn*, 15 (4), 2004. pp. 449-464.
Lee, et al., "Rapid Gel Formation and Adhesion in Photocurable and Biodegradable Block Copolymers with High DOPA Content," *Macromolecules* 39 (2006). pp. 1740-1748.
Lee, et al., "Biomimetic Adhesive Polymers Based on Mussel Adhesive Proteins," in *Biological Adhesives*, Smith, et al. (eds.), Springer-Verlag: Berlin Heidelberg, 2006. pp. 257-278.
Lee, et al., "Single-Molecule Mechanics of Mussel Adhesion," *Proc. Natl. Acad. Sci. USA*, vol. 103, No. 35 (2006), pp. 12999-13003.
Lee, et al., "Bioadhesive-Based Dosage Forms: The Next Generation," *J. Pharm. Sci.* 89 (7) (2000). pp. 850-866.
Lee, et al., "Hydrogels for Tissue Engineering," *Chem. Rev.*, vol. 101, No. 7 (Jul. 2001), pp. 1869-1879.
Lemieux, et al., "Block and Graft Copolymers and Nonage™ Copolymer Networks for DNA Delivery into Cell," *J. of Drug Targeting* 8 (2), 2000. pp. 91-105.
Li, et al., "Protein Adsortion on Oligo(ethylene glycol)-Terminated Alkanethiolate Self-Assembled Monolayers: The Molecular Basis for Nonfouling Behavior," *J. Phys. Chem. B* 109 (2005). pp. 2934-2941.
Li, et al., "Copper-Based Metallization for ULSI Applications," *MRS Bulletin* 18 (6), Jun. 1993. pp. 18-21.
Li, et al., "Chemical Modifications of Surface Active Poly(ethylene oxide)—Poly(propylene oxide) Triblock Copolymers," *Bioconj. Chem.* 7 (1996). pp. 592-599.
Li, et al., "Two-Level Antibacterial Coating with Both Release-Killing and Contact-Killing Capabilities," *Langmuir* 22 (24), 2006. pp. 9820-9823.
Long, et al., "A peptide that inhibits hydroxyapatite growth is in an extended conformation on the crystal surface," *Proc. Natl. Acad. Sci. USA* 95 (1998). pp. 12083-12087.
Lorand, et al., "Transglutaminases," *Mol. Cell. Biochem.*, vol. 58 (1984), pp. 9-35.
Love, et al., "Self-Assembled Monolayers of Thiolates on Metals as a Form of Nanotechnology," *Chem. Rev.* 105 (2005). pp. 1103-1169.
Lovich, et al., "Arterial heparin deposition: role of diffusion, convection, and extravascular space," *Am. J. Phsyiol.—Heart C.*, vol. 275 (1998), pp. 2236-2242.
Lu, et al., "Studies on the synthesis and antibacterial activities of polymeric quaternary ammonium salts from dimethylaminoethyl methacrylate," *Reactive & Functional Polymers* 67 (2007). pp. 355-366.
Lucast, "Adhesive considerations for developing stick-to-skin products," *Adhesives Age* 43 (2000). pp. 36, 38-39.
Luo, et al., "Surface-Initiated Photopolymerization of Poly(ethylene glycol) Methyl Ether Methacrylate on a Diethyldithiocarbamate-Mediated Polymer Substrate," *Macromolecules*, vol. 35 (2002), pp. 2487-2493.
Lyman, et al., "Characterization of the formation of interfacially photopolymerized thin hydrogels in contact with arterial tissue," *Biomaterials* 17 (1996). pp. 359-364.
Martin, et al., "Surface Structures of a 4-Chlorocatechol Adsorbed on Titanium Dioxide," *Environ. Sci. Technol.*, vol. 30 (1996), pp. 2535-2542.

(56) References Cited

OTHER PUBLICATIONS

Maugh, et al., "Recombinant bioadhesive proteins of marine animals anad their use in adhesive compositions," in Genex Corp. 1988: USA. pp. 196 (1987).

Matyjaszewski, et al., "Atom Transfer Radical Polymerization," *Chem. Rev.* 101 (2001). pp. 2921-2990.

McBride, "Adsorption and Oxidation of Phenolic Compounds by Iron and Manganese Oxides," *Soil Sci. Soc. Am. J.*, vol. 51 (1987), pp. 1466-1472.

McWhitrter, et al., "Siderophore-Mediated Covalent Bonding to Metal (Oxide) Surfaces during Biofilm Initiation by *Pseudomonas aeruginosa* Bacteria," *Langmuir*, vol. 19 (2003), pp. 3575-3577.

Meisel, et al., "Estimation of calcium-binding constants of casein phosphopeptides by capillary zone electrophoresis," *Anal. Chim. Acta* 372 (1998). pp. 291-297.

Mellott, et al., "Release of protein from highly cross-linked hydrogels of poly(ethylene glycol) diacrylate fabricated by UV polymerization," *Biomaterials*, vol. 22 (2001), pp. 929-941.

Merrifield, "Solid Phase Peptide Synthesis. I. The Synthesis of a Tetrapeptide," *J. Am. Chem. Soc.*, vol. 85 (Jul. 20, 1963), pp. 2149-2154.

Merrill, "Distinctions and Correspondences among Surfaces Contacting Blood," *Annals of the NY Acad. Sci.* 516 (1987). pp. 196-203.

Miron, et al., "A Simplified Method for the Preparation of Succinimidyl Carbonate Polyethylene Glycol for Coupling to Proteins," *Bioconj. Chem.* 4 (1993). pp. 568-569.

Morgan, et al., "Biochemical characterisation of polycation-induced cytotoxicity to human vascular endothelial cells," *Journal of Cell Science* 94 (3), 1989,. pp. 553-559.

Morikawa, "Tissue sealing," *Am. J. Surg.*, vol. 182 (2001), pp. 29S-35S.

Mougin, et al., "Construction of Cell-Resistant Surfaces by Immobilization of Poly(ethylene glycol) on Gold," *Langmuir*, vol. 20 (2004), pp. 4302-4305.

Mowery, et al., "Adhesion of Thermally Reversible Gels to Solid Surfaces," *Langmuir*, vol. 13 (1997), pp. 6101-6107.

Mrksich, et al., "Using Self-Assembled Monolayers that Present Oligo(ethylene glycol) Groups to Control the Interactions of Proteins with Surfaces," *American Chemical Society Symposium Series on Chemistry and Biological Applications of Polyethylene Glycol*, vol. 680 (1997), pp. 361-373.

Mukkamala, et al., "Hydrogel Polymers from Alkylthio Acrylates for Biomedical Applications," *Polymer Gels: Fundamentals and Applciations* 833 (2003). pp. 163-174.

Müller, et al., "Interaction of differentiated HL60 cells with poloxamer and poloxamine surface modified model drug carriers," *Eur. J. Phar. Sci.* 5 (1997). pp. 147-153.

Nakagawa, et al., "ENH, Containing PDZ and LIM Domains, Heart/Skeletal Muscle-Specific Protein, Associates with Cytoskeletal Proteins through the PDZ Domain," *Biocehm. Biophys. Res. Commun.* 272 (2000). pp. 505-512.

Nakayama, et al., "Newly Designed Hemostatic Technology Based on Photocurable Gelatin," *ASAIO J.*, vol. 41, No. 3 (1995), pp. M374-M378.

Nakayama, et al., "Photocurable Surgical Tissue Adhesive Glues Composed of Photoreactive Gelatin and Poly(ethylene glycol) Diacrylate," *J. Biomed. Mater. Res.*, vol. 48, Issue 4 (1999), pp. 511-521.

Nakayama, et al., "Development of high-performance stent: gelatinous photogel-coated stent that permits drug delivery and gene transfer," *J. Biomed. Mater. Res.*, vol. 57, Issue 4 (2001), pp. 559-566.

Nakonieczna, et al., "A New Convenient Route for the Synthesis of DOPA Peptides," *Liebigs Annalen der Chemie*, Issue 10 (1994). pp. 1055-1058.

Neff, et al., "A novel method for surface modification to promote cell attachment to hydrophobic substrates," J. Biomed. Mater. Res. 40 (1998). pp. 511-519.

Ninan, et al., "Adhesive strength of marine mussel extracts on porcine skin," *Biomaterials* 24 (2003). pp. 4091-4099.

Nishiyama, et al., "Effects of a strucutural change in collagen upon binding to conditioned dentin studied by $^{13}$C NMR," *J. Biomed. Mater. Res.*, vol. 29 (1995), pp. 107-111.

Nishiyama, et al., "Adhesion mechanisms of resin to etched dentin primed with *N*-methacryloyl glycine studied by $^{13}$C-NMR," *J. Biomed. Mater. Res.*, vol. 40 (1998). pp. 458-463.

Nishiyama, et al., "Adhesion of N-Methacryloyl-ω-Amino Acid Primers to Collagen Analyzed by $^{13}$C NMR," *J. Dent. Res.*, vol. 80, No. 3 (2001), pp. 855-859.

Northen, et al., "A batch fabricated biomimetic dry adhesive," *Nanotechnology* 16 (8), 2005. pp. 1159-1166.

Northen, et al., "Meso-scale adhesion testing of integrated micro- and nano-scale structures," *Sensors and Actuators A* 130-131 (2006). pp. 583-587.

Nyström, et al., "Dynamic Light Scattering and Rheological Studies of Thermoreversible Gelation of a Poly(ethylene oxide)-Poly(propylene oxide)-Poly(ethylene oxide) Triblock Copolymer in Aqueous Solution," *Faraday Discuss.* 101 (1995). pp. 335-344.

Nyström, et al., "Dynamic Viscoelasticity of an Aqueous System of a Poly(ethylene oxide)—Poly(propylene oxide)—Poly(ethylene oxide) Triblock Copolymer during Gelation," *J. Phys. Chem.* 100 (1996). pp. 5433-5439.

O'Keefe, et al., "Poloxamer-188 as an Adjunct to Primary Percutaneous Transluminal Coronary Angioplasty for Acute Myocardial Infarction," *Am. J. Cardiol.* 78 (1996). pp. 747-750.

Okino, et al., "In situ hydrogelation of photocurable gelatin and drug release," *J. Biomed. Mater. Res.*, vol. 59, Issue 2 (2001), pp. 233-245.

Ono, et al., "Photocrosslinkable chitosan as a biological adhesive," *J. Biomed. Mater. Res.*, vol. 49, Issue 2 (1999), pp. 289-295.

Ooka, et al., "Surface-Enhanced Raman Spectroscopy of DOPA-Containing Peptides Related to Adhesive Protein of Marine Mussel, *Mytilus edulis*," *Biopolymers (Biospectroscopy)*, vol. 57, Issue 2 (2000), pp. 92-102.

Orban, et al., "Cytomimetic Biomaterials. 4. In-Situ Photopolymerization of Phospholipids on an Alkylated Surface," *Macromolecules* 33 (2000). pp. 4205-4212.

Ostuni, et al., "A Survey of Structure—Property Relationships of Surfaces that Resist the Adsorption of Protein," *Langmuir* 17 (2001). pp. 5605-5620.

Palmer, et al., "Surfactant Administration Reduces Testicular Ischemia-Reperfusion Injury," *J. Urol.* 159 (1998). pp. 2136-2139.

Papov, et al., "Hydroxyarginine-containing Polyphenolic Proteins in the Adhesive Plaques of the Marine Mussel *Mytilus edulis*," *J. Biol. Chem.* 270 (34) (1995). pp. 20183-20192.

Pardo, et al., "Purification of Adhesive Proteins from Mussels," *Protein Expression and Purif.* 1 (2), 1990. pp. 147-150.

Parsons, "Characteristics of the amino acids as components of a peptide hormone sequence," in *Peptide Hormones*, University Park Press: 1976. pp. 1-7.

Pasche, et al., "Effects of Ionic Strength and Surface Charge on Protein Adsorption at PEGylated Surfaces," *J. Phys. Chem. B* 109 (2005). pp. 17545-17552.

Patel, et al., "Synthesis of Benzyl Esters of α-Amino Acids," *J. Org. Chem.* 30 (1965). pp. 3575-3576.

Peressadko, et al, "When Less is More: Experimental Evidence for Tenacity Enhancement by Division of Contact Area," *J. Adhes.* 80 (2004). pp. 247-261.

Perruchot, et al., "Synthesis of Well-Defined, Polymer-Grafted Silica Particles by Aqueous ATRP," *Langmuir*, vol. 17 (2001), pp. 4479-4481.

Pierpont, et al., "Transition Metal Complexes of *o*-Benzoquinone, *o*-Semiquinone, and Catecholate Ligands," *Coord. Chem. Rev.*, vol. 38 (1981), pp. 45-87.

Prime, et al., "Adsorption of Proteins onto Surfaces Containing End-Attached Oligo(ethylene oxide): A Model System Using Self-Assembled Monolayers," *J. Am. Chem. Soc.* 115 (1993). pp. 10714-10721.

Prucker, et al., "Polymer Layers through Self-Assembled Monolayers of Initiators," *Langmuir*, vol. 14 (1998), pp. 6893-6898.

Pyun, et al., "Synthesis of Polymer Brushes Using Atom Transfer Radical Polymerization, " *Macromol. Rapid. Commun.* 24 (2003). pp. 1043-1059.

(56) References Cited

OTHER PUBLICATIONS

Rajh, et al., "Surface Restructuring of Nanoparticles: An Efficient Route for Ligand-Metal Oxide Crosstalk," *J. Phys. Chem. B*, vol. 106 (2002), pp. 10543-10552.
Ramakrishna, et al., "Effect of Particle Size on the Reactivity of Quantum Size ZnO Nanoparticles and Charge-Transfer Dynamics with Adsorbed Catechols," *Langmuir*, vol. 19 (2003), pp. 3006-3012.
Ranger, et al., "Pneumostasis of Experimental Air Leaks with a New Photopolymerized Synthetic Tissue Sealant," *Am. Surg.*, vol. 63, Issue 9 (1997), pp. 788-795.
Reed, et al., "A One-Step Synthesis of Monoprotected Polyethylene Glycol Ethers," *J. Org. Chem.*, vol. 65 (2000), pp. 5843-5845.
Rodriguez, et al., "Surface Complexation at the $TiO_2$ (anatase)/Aqueous Solution Interface: Chemisorption of Catechol," *J. Colloid Interface Sci.*, vol. 177 (1996), pp. 122-131.
Rodriguez-Hernández, et al., "High Branched Poly(L-lysine)," *Biomacromolecules*, vol. 4 (2003), pp. 249-258.
Ross-Murphy, "Rheological Characterization of Polymer Gels and Networks," *Polym. Gels Networks*, vol. 2 (1994), pp. 229-237.
Rozier, et al., Gelrite®: A novel, ion-activated, in situ gelling polymer for ophthalmic vehicles. Effect on bioavailability of timolol, *Int. J. Pharm.* 57 (2), 1989. pp. 163-168.
Ruel-Gariépy, et al., "In situ-forming hydrogels—review of temperature-sensitive systems," *Eur. J. Pharm. Biopharm.* 58 (2004). pp. 409-426.
Ruibal, et al., "The Structure of the Digital Setae of Lizards," *J. Morph.* 117 (1965). pp. 271-294.
Ryu, et al., "A Generalized Approach to the Modification of Solid Surfaces," *Science* 308 (2005). pp. 236-239.
Rzepecki, et al., "α,β-Dehydro-3,4-dihydroxyphenylalanine Derivatives: Potential Schlerozation Intermediates in Natural Composite Materials," *Arch. Biochem. Biophys.* 285 (1) (1991). pp. 17-26.
Rzepecki, et al., "Wresting the muscle from mussel beards: research and applications," *Mol. Mar. Biol. Biotech.* 4 (4) (1995). pp. 313-322.
Rzepecki, et al., "Bioadhesives: DOPA and Phenolic proteins as components of organic composite materials", *Principles of Cell Adhesion*, P.D. Richardson and M. Steiner (eds.), CRC Press, Boca Raton, FL. (1995). pp. 107-142142.
Saby, et al., "*Mytilus edulis* Adhesive Protein (MAP) as an Enzyme Immobilization Matrix in the Fabrication of Enzyme-Based Electrodes," *Electroanalysis* 10 (17) (1998). pp. 1193-1199.
Sanborn, et al., "In situ crosslinking of a biomimetic peptide-PEG hydrogel via thermally triggered activation of factor XIII," *Biomaterials*, vol. 23 (2002), pp. 2703-2710.
Sawada, et al., "Micropatterning of Copper on a Poly(ethylene terephthalate) Substrate Modified with a Self-Assembled Monolayer," *Langmuir* 22 (2006). pp. 332-337.
Sawhney, et al., "Interfacial photopolymerization of poly(ethylene glycol)-based hydrogels upon alginate-poly(*l*-lysine) microcapsules for enhanced biocompatibility," *Biomaterials*, vol. 14, No. 13 (1993), pp. 1008-1016.
Sawhney, et al., "Bioerodible Hydrogels Based on Photopolymerized Poly(ethylene glycol)-*co*-poly(α-hydroxy acid) Diacrylate Macromers," *Macromolecules*, vol. 26 (1993), pp. 581-587.
Schmolka, "Articifial Skin. I. Preparation and Properties of Pluronic F-127 Gels for Treatment of Burns," *J. Biomed. Mater. Res.* 6 (6) (1972). pp. 571-582.
Schnurrer, et al., "Mucoadhesive properties of the mussel adhesive protein," *Int. J. Pharm.* 141 (1996). pp. 251-256.
Sever, et al., "Synthesis of peptides containing DOPA (3,4-dihydroxyphenylalanine)," *Tetrahedron* 57 (2001). pp. 6139-6146.
Sever, et al., "Metal-Mediated Cross-Linking in the Generation of a Marine-Mussel Adhesive," *Angew. Chem. Int. Ed.*, vol. 43 (2004), pp. 448-450.
Shull, et al., "Fracture Mechanics Studies of Adhesion in Biological Systems," *Interface Sci.*, vol. 8 (2000), pp. 95-110.
Shull, "Contact mechanics and the adhesion of soft solids," *Mater. Sci. Eng., R* 36 (2002). pp. 1-45.
Sichel, et al., "Relationship Between Melanin Content and Superoxide Dismutase (SOD) Activity in the Liver of Various Species of Animals," *Cell Biochem. Funct.* 5 (1987). pp. 123-128.
Sierra, "Fibrin Sealant Adhesive Systems: A Review of Their Chemistry, Material Properties and Clinical Applications," *J. Biomed. Appl.*, vol. 7 (1993), pp. 309-352.
Skelhorne, et al., "Hydrogel Adhesives for Wound-Care Applications," *Medical Device Technology* (Nov. 2002). pp. 19-23.
Soriaga, et al., "Determination of the Orientation of Adsorbed Molecules at Solid-Liquid Interfaces by Thin-Layer Electrochemistry: Aromatic Compounds at Platinum Electrodes," *J. Am. Chem. Soc.* 104 (1982). pp. 2735-2742.
Sousa, et al., "Human Serum Albumin Adsorption on $TiO_2$ from Single Protein Solutions and from Plasma," *Langmuir*, vol. 20 (2004), pp. 9745-9754.
Sperinde, et al., "Synthesis and Characterization of Enzymatically-Cross-Linked Poly(ethylene glycol) Hydrogels," *Macromolecules* 30 (18) (1997). pp. 5255-5264.
Sperinde, et al., "Control and Prediction of Gelation Kinetics in Enzymatically Cross-Linked Poly(ethylene glycol) Hydrogels," *Macromolecules* 33 (2000). pp. 5476-5480.
Spolenak, et al., "Adhesion design maps for bio-inspired attachment systems," *Acta. Biomater.* 1 (2005). pp. 5-13.
Spotnitz, "History of Tissue Adhesives." In: Sierra, et al. (eds.), *Surgical Adhesives and Sealants: Current Technology and Applications*. Technomic Publishing Company, Inc.: Lancaster, PA (1997). pp. 3-11.
Spotnitz, "Commercial fibrin sealants in surgical care," *Am. J. Surg.* 182 (2001). pp. 8S-14S.
Statz, et al., "New Peptidomimetic Polymers for Antifouling Surfaces," *J. Am. Chem. Soc.*, vol. 127, No. 22 (2005), pp. 7972-7973.
Stevens, "Trace bio-organic constituents of gelatins—a review," *Food Australia*, vol. 44, No. 7 (1992), pp. 320-324.
Stile, et al., "Sequential robust design methodology and X-ray photoelectron spectroscopy to analyze the grafting of hyaluronic acid to glass substrates," *J. Biomed. Mater Res.*, vol. 61, Issue 3 (2002), pp. 391-398.
Stiles, et al., "Axisymmetric Adhesion Test to Examine the Interfacial Interactions between Biologically-Modified Networks and Models of the Extracellular Matrix," *Langmuir*, vol. 19 (2003), pp. 1853-1860.
Strausberg, et al., "Protein-based medical adhesives," *Trends in Biotechnology* 8 (2) (1990). pp. 53-57.
Strausberg, et al., "Development of a microbial system for production of mussel adhesive protein." In: *Adhesives from Renewable Resources*. Hemingway, et al. (eds.), ACS Symposium Series 385, American Chemical Society, Washington, D.C. (1989). pp. 453-464.
Sugumaran, et al., "Chemical- and Cuticular Phenoloxidase-Mediated Synthesis of Cysteinyl-Catechol Adducts," *Arch. Insect Biochem. Physiol.* 11 (2) (1989). pp. 127-137.
Sugumaran, "Unified Mechanism for Sclerotization of Insect Cuticle," *Adv. Insect. Physiol.*, vol. 27 (1998), pp. 229-334.
Sun, et al., "Improved antifouling property of zwitterionic ultrafiltration membrane composed of acrylonitrile and sulfobetaine copolymer," *J. of Memr. Sci.* 285 (2006). pp. 299-305.
Sun, et al., "The Nature of the Gecko Lizard Adhesive Force," *Biophys. J.* 89 (2005). pp. L14-L16.
Swerdloff, et al., "Solid phase synthesis of bioadhesive analogue peptides with trifluoromethanesulfonic acid cleavage from PAM resin," *Int. J. Peptide Protein Res.*, vol. 33 (1989), pp. 318-327.
Tae, et al., "Sustained release of human growth hormone from in situ forming hydrogels using self-assembly of fluoroalkyl-ended poly(ethylene glycol)," *Biomaterials*, vol. 26 (2005), pp. 5259-5266.
Taira, et al., "Analysis of Photo-iniators in Visible-light-cured Dental Composite Resins," *J. Dent. Res.*, vol. 67, No. 1 (1988), pp. 24-28.
Tan, et al., "Surface modification of nanoparticles by PEO/PPO block copolymers to minimize interactions with blood components and prolong blood circulation in rats," *Biomaterials*, vol. 14, No. 11 (1993), pp. 823-833.
Tatehata, et al., "Model Polypeptide of Mussel Adhesive Protein. I. Synthesis and Adhesive Studies of Sequential Polypeptides (X-Tyr-Lys)$_n$ and (Y-Lys)$_n$," *J. Appl. Polym. Sci.*, vol. 76, No. 6 (2000), pp. 929-937.

(56) References Cited

OTHER PUBLICATIONS

Taylor, et al., "Polargraphic and Spectrophotometric Investigation of Iron(III) Complexation to 3,4-Dihydroxyphenylalanine-Containing Peptides and Proteins from *Mytilus edulis*," *Inorg. Chem.*, vol. 33 (1994), pp. 5819-5824.
Taylor, et al., "*trans*-2,3-*cis*-3,4-Dihydroxyproline, a New Naturally Occurring Amino Acid, is the Sixth Residue in the Tandemly Repeated Consensus Decapeptides of an Adhesive Protein from *Mytilus edulis*," *J. Am. Chem. Soc.*, vol. 116 (1994), pp. 10803-10804.
Taylor, et al., "Ferric Ion Complexes of a DOPA-Containing Adhesive Protein from *Mytilus edulis*," *Inorg. Chem.*, vol. 35 (1996), pp. 7572-7577.
Uyama, et al., "Surface Modification of Polymers by Grafting," *Advances in Polymer Science*, vol. 137 (1998), pp. 1-39.
Venkatraman, et al., "Skin adhesives and skin adhesion. 1. Transdermal drug delivery systems," *Biomaterials*, vol. 19 (1998), pp. 1119-1136.
Vörös, et al., "Optical grating coupler biosensors," *Biomaterials*, vol. 23 (2002), pp. 3699-3710.
Waite, "Evidence for a Repeating 3,4-Dihydroxyphenylalanine- and Hydroxyproline-containing Decapeptide in the Adhesive Protein of the Mussel, *Mytilus edulis* L.," *J. Biol. Chem.*, vol. 258, No. 5 (1983), pp. 2911-2915.
Waite, et al., "Assay of Dihdroxyphenylalanine (Dopa) in Invertebrate Structural Proteins," *Methods Enzymol.*, vol. 107 (1984), pp. 397-413.
Waite, "Adhesion àla Moule," *Integr. Comp. Biol.*, vol. 42 (2002), pp. 1172-1180.
Waite, "Mussel Beards: A Coming of Age" *Chem. Ind.* (Sep. 2, 1991), pp. 607-611.
Waite, "Nature's underwater adhesive specialist," *Int. J. Adhes. Adhes.*, vol. 7, No. 1 (1987), pp. 9-14.
Waite, "Nature's underwater adhesive specialist," *Chemtech*, vol. 17 (1987), pp. 692-697.
Waite, et al., "3,4-Dihydroxyphenylalanine in an Insoluble Shell Protein of *Mytilus edulis*," *Biochem. Biophys. Acta*, vol. 541 (1978), pp. 107-114.
Waite, et al., "Polyphosphoprotein from the Adhesive Pads of *Mytilus edulis*," *Biochemistry*, vol. 40 (2001), pp. 2887-2893.
Waite, et al., "The Bioadhesive of *Mytilus byssus*: A Protein Containing L-DOPA," *Biochem. & Biophy. Res. Comm.*, vol. 96, No. 4 (1980), pp. 1554-1561.
Waite, et al., "Mussel Adhesion: Finding the Tricks Worth Mimicking," *J. Adhes.*, vol. 81 (2005), pp. 297-317.
Waite, et al., "Polyphenolic Substance of *Mytilus edulis*: Novel Adhesive Containing L-Dopa and Hydroxyproline," *Science*, vol. 212, No. 4498 (1981), pp. 1038-1040.
Waite, "Precursors of Quinone Tanning: Dopa-Containing Proteins," *Methods Enzymol.*, vol. 258 (1995), pp. 1-21.
Wang, et al., "Facile synthesis of well-defined water-soluble polymers via atom transfer radical polymerization in aqueous media at ambient temperature," *Chem. Commun.* (1999), pp. 1817-1818.
Wang, et al., "Facile Atom Transfer Radical Polymerization of Methoxy-Capped Oligo(ethylene glycol) Methacrylate in Aqueous Media at Ambient Temperature," *Macromolecules*, vol. 33 (2000), pp. 6640-6647.
Wanka, et al., "The aggregation behavior of poly-(oxyethylene)-poly-(oxypropylene)-poly(oxyethylene)-block-copolymers in aqueous solution," *Cooloid. Polym. Sci.*, vol. 268 (1990), pp. 101-117.
Warner, et al., "Expression of multiple forms of an adhesive plaque protein in an individual mussel, *Mytilus edulis*," *Mar. Biol.*, vol. 134 (1999), pp. 729-734.
Watanabe, et al., "Bonding durability of photocured phenyl-P in TEGDMA to smear layer-retained bovine dentin," *Quint. Int.*, vol. 24, No. 5 (1993), pp. 335-342.
Webber, et al., "Effects of geometric confinement on the adhesive debonding of soft elastic solids," *Phys. Rev. E*, vol. 68 (2003), pp. 021805-1-to-021805-11.
Whitesides, "The origins and the future of microfluidics," *Nature*, vol. 442 (2006), pp. 368-373.
Wisniewski, et al., "Methods for reducing biosensor membrane biofouling," *Colloids Surf., B*, vol. 18 (2000), pp. 197-219.
Yamada, "Chitosan Based Water-Resistant Adhesive. Analogy to Mussel Glue," *Biomacromolecules*, vol. 1 (2000), pp. 252-258.
Yamamoto, "Marine Adhesive Proteins and Some Biotechnological Applications," *Biotechnol. Genet. Eng. Rev.*, vol. 13 (1996), pp. 133-165.
Yamamoto, "Adhesive studies of synthetic polypeptides: A model for marine adhesive proteins," *J. Adhesion Sci. Tech.*, vol. 1, No. 2 (1987), pp. 177-183.
Yamamoto, "Synthesis and Adhesive Studies of Marine Polypeptides," *J. Chem. Soc. Perkin Trans.*, vol. 1 (1987), pp. 613-618.
Yamamoto, "Insolubilizing and adhesive studies of water-soluble synthetic model proteins," *Int. J. Biol. Macromol.*, vol. 12 (1990), pp. 305-310.
Yamamoto, et al., "Synthesis and Adhesives of Marine Adhesive Proteins of the Chilean Mussel *Aula comya ater*," *Biomimetics*, vol. 1, No. 3 (1992), pp. 219-238.
Yamamoto, et al., "Work of Adhesion of Synthetic Polypeptides Containing L-Lysine," *J. Colloid Interface Sci.*, vol. 156 (1993), pp. 515-517.
Yamamoto, et al., "Wettability and Adhesion of Synthetic Marine Adhesive Proteins and Related Model Compounds," *J. Colloid Interface Sci.*, vol. 176 (1995), pp. 111-116.
Yang, et al., "Physicochemical aspects of drug delivery and release from polymer-based colloids," *Curr. Opin. Colloid Interface Sci.*, vol. 5 (2000), pp. 132-143.
Young, et al., "Marine Animals and Adhesion." In: Allen (ed.), *Adhesion* 6. Applied Science Publishers: London and New Jersey, 1982. pp. 19-39.
Yu, et al., "Micellisation and Gelation of Triblock Copoly(oxyethylene/oxypropylene/oxyethylene), F127," *J. Chem. Soc., Faraday Trans.*, vol. 88, No. 17 (1992), pp. 2537-2544.
Yu, et al., "Synthetic Polypeptide Mimics of Marine Adhesives," *Macromolecules*, vol. 31 (1998), pp. 4739-4745.
Yu, et al., "Role of L-3,4-Dihydroxyphenylalanine in Mussel Adhesive Proteins," *J. Am. Chem. Soc.*, vol. 121 (1999), pp. 5825-5826.
Yurdumakan, et al., "Synthetic gecko foot-hairs from multiwalled carbon nanotubes," *Chem. Commun.*, vol. 30 (2005), pp. 3799-3801.
Zekorn, et al., "Biocompatibility and immunology in the encapsulation of islets of Langerhans (bioartificial pancreas)," *Int. J. Artif. Organs*, vol. 19, No. 4 (1996), pp. 251-257.
Zeng, et al., "Synthesis and Characterization of DOPA-PEG Conjugates," *Polymer Preprints*, vol. 41, No. 1 (2000), pp. 989-990.
Zhan, et al., "Functionalization of Nano-Faujasite Zeolite with PEG-Grafted PMA Tethers Using Atom Transfer Radical Polymerization," *Macromolecules*, vol. 37 (2004), pp. 2748-2753.
Zhao, et al., "Polymer brushes: surface-immobilized macromolecules," *Prog. Polym. Sci.*, vol. 25 (2000), pp. 677-710.
Zuckermann, et al., "Efficient Method for the Preparation of Peptoids [Oligo(N-substituted glycines)] by Submonomer Solid-Phase Synthesis," *J. Am. Chem. Soc.*, vol. 114 (1992), pp. 10646-10647.
Dalsin et al., Bioinspired Antifouling Polymers. Materials Today 2005, 8, 9 (38-46).
Gristina, Biomaterial-Centered Infection—Microbial Adhesion Versus Tissue Integration. Science 1987, 237, (4822), 1588-1595.
Evans et al., Iron Chelator, Exopolysaccharide and Protease Production in *Staphylococcus*-Epidermidis—a Comparative-Study of the Effects of Specific Growth-Rate in Biofilm and Planktonic Culture. Microbiology-Uk 1994, 140, 153-157.
Yu et al., Adhesion of Coagulase-Negative *Staphylococci* and Adsorption of Plasma-Proteins to Heparinized Polymer Surfaces. Biomaterials 1994,15, (10), 805-814.
Jose et al., *Vancomycin* covalently bonded to titanium beads kills *Staphylococcus aureus*. Chemistry & Biology 2005, 12, (9), 1041-1048.
Desai et al., Surface-Immobilized Polyethylene Oxide for Bacterial Repellence. Biomaterials 1992, 13, (7), 417-420.
Burdinski et al., Universal Ink for Microcontact Printing. Angewandte Chemie 2006, 45, 1-5.

(56) References Cited

OTHER PUBLICATIONS

Floriolli et al., Marine surfaces and the expression of specific byssal adhesive protein variants in *Mytilus*. Mar Biotechnol 2000, 2, 352-363.

Bain et al., Molecular-level Control over Surface Order in Self-Assembled Monolayer Films of Thiols on Gold. Science 1988, 240, (4848), 62-63.

Waite, Reverse engineering of bioadhesion in marine mussels. Bioartificial Organs ii: Technology, Medicine, and Materials 1999, 875, 301-309.

Pasche et al., Poly(l-lysine)-graft-poly(ethylene glycol) assembled monolayers on niobium oxide surfaces: A quantitative study of the influence of polymer interfacial architecture on resistance to protein adsorption by ToF-SIMS and in situ OWLS. Langmuir 2003,19, (22), 9216-9225.

Zhang et al., Reactive coupling of poly(ethylene glycol) on electroactive polyaniline films for reduction in protein adsorption and platelet adhesion. Biomaterials 2002, 23, (3), 787-795.

Holl et al., Solid-State NMR Analysis of Cross-Linking in Mussel Protein Glue. Archives of Biochemistry and Biophysics 1993, 302, (1),255-258.

\* cited by examiner ial Application 60/835,615 filed Aug. 04, 2006, entitled "Geckel-Mimetic Nanostructures, Materials, Methods and Applications Therefore." The entirety of the aforementioned 60/835,615 Provisional Patent Application, including all references and attachments incorporated by reference therein, are incorporated by reference into this application.

STATEMENT REGARDING FEDERALLY SPONSORED RESEARCH OR DEVELOPMENT

The invention was made with government support under Grant No. DE014193 awarded by the National Institutes of Health, and Grant No. NCC-1-02037 awarded by the National Aeronautics and Space Administration The government has certain rights in the invention.

BACKGROUND OF THE INVENTION

The ability of the gecko to climb vertical surfaces, seemingly in defiance of gravity, has been a source of amazement and scientific inquiry for many years. Since about 1965, it has been known that the adhesive strategy of the gecko relies on foot pads composed of specialized keratinous foot-hairs called setae, which are subdivided into terminal spatulae of dimensions approximately 200 nm.[1] Contact between the gecko foot and an opposing surface generates adhesive forces that are sufficient to allow the gecko to cling onto vertical and even inverted surfaces. Although strong, the adhesion is temporary, permitting rapid detachment and reattachment of the gecko foot during locomotion. Researchers have attempted to capture the unique properties of gecko adhesive in synthetic mimics with nanoscale surface features reminiscent of setae,[2-7] however maintenance of adhesive performance over many cycles has been elusive,[2, 8] and gecko adhesion is dramatically diminished upon full immersion in water.[9-10]

Many organisms found in water use chemical bioglues for various purposes such as adhesion, defense mechanism, and symbiosis. Those glues are found in barnacles, mussels, and microbes colonized on inorganic surfaces at an early stage of biofouling. Among these, the adhesion mechanism of mussels has been well characterized; 3,4-dihydroxy-L-phenylalanine, DOPA, is found in adhesive pads and has been considered as a key component responsible for the strong holdfast under water. The present invention provides a unique "mimetic" functional combination of the two unique natural adhesion mechanisms inspired by geckos and mussels.

BRIEF SUMMARY OF THE INVENTION

Briefly, in one aspect, the present invention is a multi-component, modular adhesive complex or apparatus comprising 1) an adhesive coating, 2) a go-between nanostructural or microstructural array, and 3) a bottom-most supporting material, or means, or substrate. This modular adhesive complex is capable of achieving renewable adhesive contacts or retaining adhesion characteristics in a high humidity or a wet, as well as an ambient, dry or arid environment. Single adhesive or permanent use, i.e., a single mating or application of adhesive working surfaces, is also contemplated.

The adhesive coating is to be broadly interpreted as a coating or film of sufficient thickness and area so as to provide a complete or partial coverage of the nanostructural array, especially a working surface or exposed surface, for purposes of creating an adhesive or adhesion relationship. The coating provides interfacial binding ability to the modular adhesive complex through various adhesive mechanisms i.e. chemical (ionic, hydrogen, or colvalent) bond formation, van der Waals forces, capillary forces, electrostatic interactions, diffusion, mechanical interlocking, etc. The coating or film is applied to, and binds strongly to, the underlying nanostructural array, transferring interfacial stress to bulk material consisting of nanostructural array and the supporting material. In a preferred embodiment, the coating is comprised of DHPD (dihydroxyphenyl derivative) or DHPP i.e. a polymer comprising a variable number, distribution, or concentration of DHPD. DHPD and DHPP are further defined below.

In a further aspect the present invention is a microstructural array or microarray having a coating disposed or applied upon an exposed or working surface thereof. "Working surface" for purposes of this invention is any surface, or any portion thereof directly or indirectly involved in creating adhesion or an adhesive structure, array, or relationship. The layer or coating is preferably DHPD (dihydroxyphenyl derivative) or DHPP i.e., DHPD-containing polymer. The DHPD, which is to be broadly interpreted, is of sufficient thickness and area so as to provide the array with an optionally renewable adhesive or adhesion character in a high humidity or wet environment. Single adhesive or permanent use, i.e., a single mating or application of array working surfaces, is also contemplated.

In one aspect, the microstructures (or nanopillars as they may be called) of the array are substantially columnar, setae-like, spatulae-like or elongate and upstand, upend, protrude, or extend from a substrate and have an exposed area, working area or workpiece, end or surface. The exposed area, end, or surface of the columnar microstructure has a DHPD coating or layer disposed thereon, the DHPD layer having sufficient thickness and area in one embodiment, so that the microstructure is adhesive in a high humidity or wet environment. In a preferred practice the adhesive character of the DHPD layer is renewable as discussed below. In one embodiment of this aspect of the invention the columnar microstructures have a working surface, the coating DHPD, e.g., being disposed thereon. The columnar, setae-like structure comprises a structural polymeric material.

The nanostructural array is to be broadly interpreted as having an arrangement, collection, parade, of ordered or disordered, random, sequential, or hierarchical structural or geometric features, textures, projections or surfaces with dimensions in the nanoscale (e.g., 0.1-100 nm) and microscale (e.g., 100 nm-100 µm) range or the combination thereof. Possible geometric features include but are not limited to fibers, columns, pillars, loops, tubes, cones, blocks, cubes, hemispheres, spheres, walls, grids, plains, holes, or indentations of regular, irregular, or uneven shape of the combination thereof. The nanostructural arrays are anchored, attached, or glued to, or protrude or extend from the bottommost supporting material (e.g., substrate) and provide an exposed area, working area or workpiece, end or surface with the adhesive coating being applied or disposed thereon. The nanostructural array promotes interfacial contact through substantially increased surface area or the ability to make contact with defects of nanoscale and macroscale sizes on the adherent surface. The possibility of mechanical interlocking between the nanostructural array and a second array or other surface, especially the microstructure thereof, is also included within the present invention. The nanostructural array can be comprised of an organic or inorganic polymeric material, carbon in the form of rods or tubes or spheres, or inorganic solids such as metals, metal oxides and ceramics.

The supporting material or substrate is to be broadly interpreted as a macroscaled base, bulk, or backing material having sufficient cohesive properties, miscibility with the nanostructural array, and elasticity. It is preferable that the supporting material exhibits sufficient cohesive or bulk mechanical properties for holding the whole adhesive complex intact in the presence of applied stresses i.e. peeling or detaching forces. Sufficient miscibility with or allowing attachment or anchoring of nanostructural array is necessary for transferring interfacial stresses. Elasticity is needed for the deformation of the adhesive complex. Examples of material support include but are not limited to elastomers (i.e. silicone-, acrylate-, urethane-, polyester-, polyether-based polymers or natural and synthetic rubber), but could be semicrystalline or noncrystalline polymer with sufficient flexibility as described. It is preferable that the supporting material is constructed from the same or dissimilar material as the nanostructural array.

Another aspect of this invention comprises a method of adhering surfaces to one another, preferably in a high humidity, wet, ambient or dry environment. The method comprises the following steps:

(1) providing a modular adhesive complex comprising a bulk material constructed or disposed thereupon an array of nanoscaled features having an exposed area, end, or surface on which there is a further disposed superficial layer of adhesive coating preferably of DHPP;

(2) adhering the adhesive complex to a second surface with the DHPD layer being applied there between;

(3) detaching or removing the complex from the second surface, the DHPD layer adhering to nanostructural array which is attached the bottommost bulk material; and (4) adhering the adhesive complex to the second surface (or to a third surface).

It is in the above sense that the present invention provides a "renewable" or "repositionable" adhesive or adhesion quality. A modular adhesive complex of this invention can be adhered to a second surface, removed from the surface, and re-adhered or reattached to the same or a different second surface, during which, each component remains intact. The renewable adhesion hereby permitted may be renewed or re-created two or more times, preferably multiple times, and most preferably hundreds to thousands of times with either the same or a new second surface. In the parlance of conventional adhesion or adhesive products, arrays of this invention could be described as "repositionable."

A further aspect of this invention comprises a method of adhering surfaces to one another, preferably in a high humidity or wet environment. The method is comprised of the following steps:

(1) providing an array of columnar microstructures pending upstanding or projecting from a substrate or support, the microstructures having an exposed area, end, or surface or working surface on which there is disposed a layer or coating e.g., of DHPD;

(2) adhering the array to a second surface with the DHPD layer being disposed therebetween;

(3) detaching or removing the array from the second surface, the DHPD layer adhering to the columnar microstructure and to itself; and optionally (4) adhering the array to the second surface (or to a third surface in second or subsequent repositionings). In one version, the second surface is an array of this invention.

It is in the above sense that the present invention provides a "renewable" adhesive or adhesion quality. An array of this invention can be adhered to a second surface, removed from the surface, and re-adhered or reattached to the same or a different second surface. The renewable adhesion hereby permitted may be renewed or re-created two or more times, preferably multiple times, and most preferably hundreds to thousands of times with either the same or a new second surface. In the parlance of conventional adhesion or adhesive products, arrays of this invention could be described as "repositionable."

Adhesive coating (or plaque) containing no DHPD is also contemplated, see e.g., FIG. 8 and associated discussion. Thus the term coating as used herein is to be broadly construed to include adhesive coating, resistive coating (e.g., resistive to cellular adhesion), as well as protective coating.

It is noted that the present invention provides adhesion in high humidity, "highly humid" or "wet" environments. "Highly humid" or "high humidity" environments herein means environments having ambient relative humidity of at least 50%, preferably 70%, and most preferably 80% up to what is considered "wet," "saturated" or even "super-saturated" environments. Adhesion under dry environment is also contemplated herein.

"DHPD" and its chemistry are discussed in greater detail below.

"DHPP" as used herein is to be understood to mean polymeric, crosslinked, or network structures containing multiple i.e., two or more DHPD structures, units or moieties. DHPP has the following preferred characteristics:

Weight average molecular weight between 10,000 and 5,000,000 Da but preferably between 100,000 and 1,000,000 Da.

The abundance of DHPD moieties in DHPP can vary between 0 to 100 weight percent, but is preferably between 10 and 50 weight percent.

DHPP contains between one and 10 substituents but is preferably between one and 4.

DHPP can consist of single, di-, tri-, and multi-block of singular, random, sequential, or ordered substituents.

DHPP is preferably water insoluble, but can be water swellable.

DHPP can have linear, brush, branched, hyper-branched, crosslinked, network, gel, or hydrogel architecture.

DHPP is preferably acrylate-based, but can consist of ether, urethane, urea, amide, carbonate, or ester linkages, or any combination thereof.

DHPP is preferably hydrophilic or amphiphilic but can be hydrophobic.

DHPP can include chemically linked, crosslinked, or polymerized forms of multiple DHPP and/or DHPD.

The terms "nanostructure" and "microstructure" are used herein. Nanostructures are features or textures having dimensions of nanoscale (e.g., 0.1-100 nm) in size. Microstructures are features or textures of dimensions of microscale (e.g., 100 nm-100 mm) in size. Unless otherwise indicated by the context, no criticality should be accorded to the use of one term versus the other.

The terms "array", "nanoarray", and "microarray" are used herein. These terms are to be broadly interpreted to mean geometric features, textures, or surfaces having likeness of fibers, columns, pillars, loops, tubes, cones, blocks, cubes, hemispheres, spheres, walls, grids, plains, holes, or indentations of regular, irregular, or uneven shape, support, substrate, or the combination thereof, projecting from or attached, anchored, or glue to a support, member or backing member.

The preferred coating layer of this invention comprises DHPD of formula (I) wherein

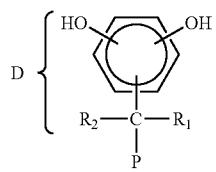

(I)

$R_1$ and $R_2$ may be the same or different and are independently selected from the group consisting of hydrogen, saturated and unsaturated, branched and unbranched, substituted and unsubstituted $C_{1-4}$ hydrocarbon;

x is a value between zero and four.

P is separately and independently selected from the group consisting of —$NH_2$, —COOH, —OH, —SH,

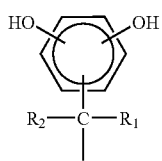

wherein $R_1$, $R_2$, and x are defined above, a single bond, halogen,

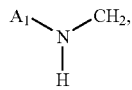

wherein $A_1$ is selected from the group consisting of H, C, a single bond,
a protecting group, substantially alkyl, substantially poly(alkyleneoxide),

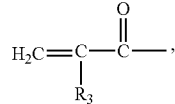

wherein $R_3$ is H or $C_{1-6}$ lower alkyl;

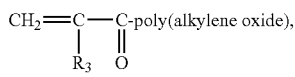

wherein $R_3$ is defined above;

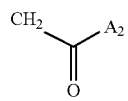

wherein $A_2$ is selected from the group of —OH, C, —NH—, in addition to the definition of $A_1$;

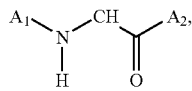

wherein $A_1$ and $A_2$ are defined above;

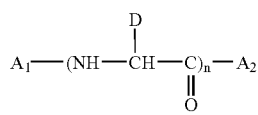

wherein n ranges between 1 and about 3 and $A_1$ and $A_2$ are defined above;

In one aspect the poly(alkylene oxide) has the structure

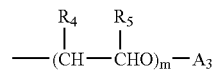

wherein $R_4$ and $R_5$ are separately and independently H, or $CH_3$ and m has a value in the range between 1 and about 250, $A_3$ is —$NH_2$—COOH, —OH, and —SH, —H or a protecting group.

In a very preferred form, DHPD is

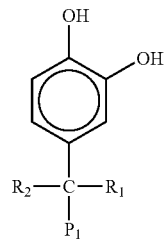

$R_1$, $R_2$, and P being defined as above.

In a further preferred form DHPD is of the structure:

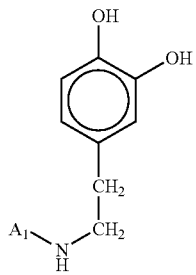

wherein $A_1$ is of the structure

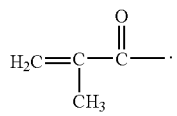

These dihydroxyphenyl derivative (DHPD) adhesives function well in an aqueous or a high humidity environment. To for the polymeric composition, a DHPD moiety which generally provides adhesive functionality is coupled to a polymer which provides the desired adhesive or surface effect. These components are described in detail in U.S. Application S.N. 11/068,298 at paragraphs [0054] and [0057]-[0070] as numbered in the application as filed. That disclosure, as published in U.S. Patent Publication No. US 2005/0288398, is specifically incorporated by reference herein in its entirety.

DETAILED DESCRIPTION OF THE INVENTION

Figure 1:
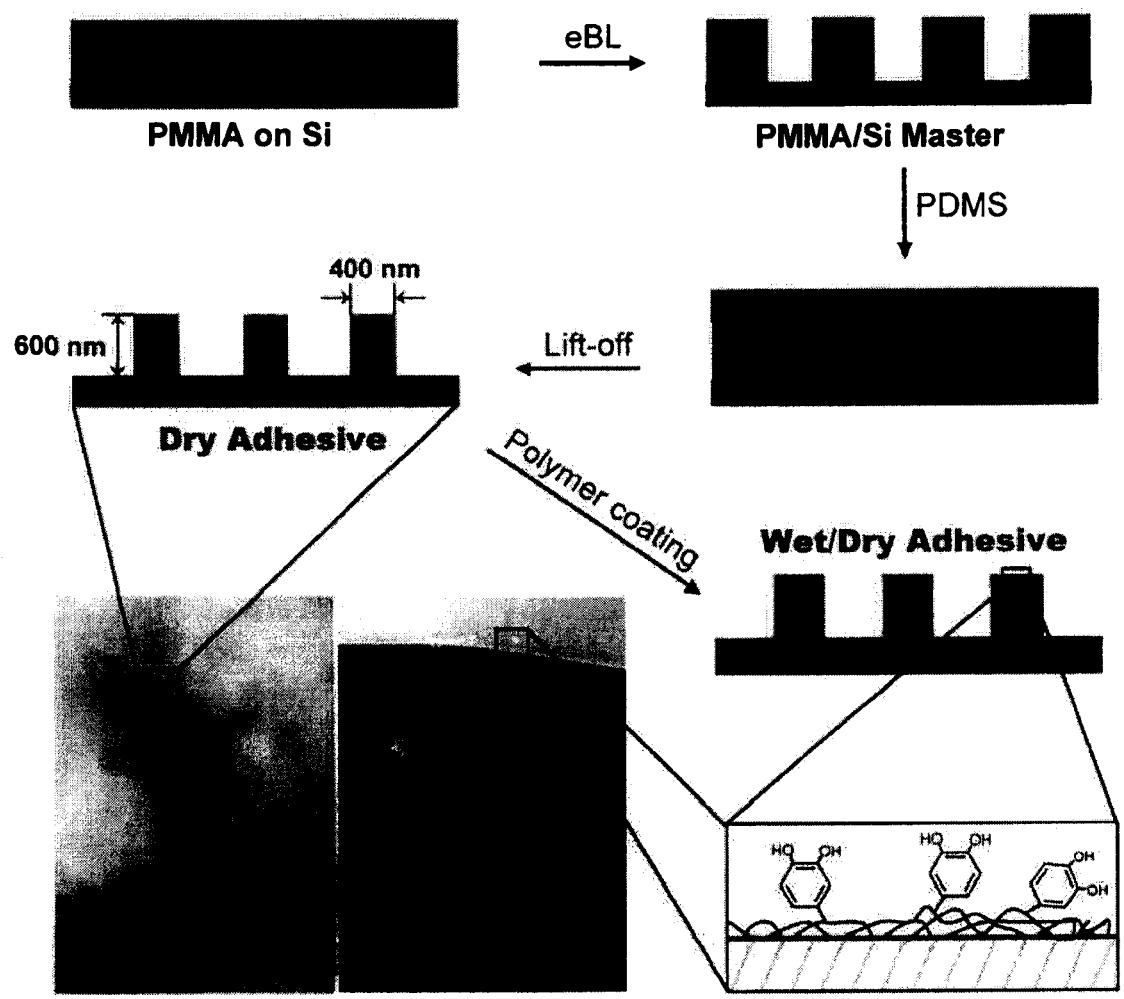
FIG. 1 Rational design and fabrication of wet/dry hybrid nanoadhesive. E-beam lithography (eBL) was used to create an array of holes in a polymethyl methacrylate (PMMA) thin film supported on Silicon (Si) (PMMA/Si master). Casting of poly(dimethylsiloxane) (PDMS) onto the master followed by curing and lift-off resulted in gecko-mimetic nanopillar arrays. Finally, a mussel adhesive protein mimetic polymer is coated onto the fabricated nanopillars. The topmost organic layer contains catechols, a key component of wet adhesive proteins found in mussel holdfasts.

Described herein is a new class of hybrid biologically-inspired adhesives comprising an array of nanofabricated polymer columnar pillars coated with a thin layer of a synthetic polymer that mimics the wet adhesive proteins found in mussel holdfasts. Wet adhesion of the nanostructured polymer pillar arrays of this invention increased nearly 15-fold when coated with mussel adhesive protein mimetic polymer. The adhesive can function like a sticky note (a repositionable partially adherent note structure), maintaining its adhesive performance for over 1000 contact cycles in both dry and wet environments. This hybrid adhesive, which uniquely combines the salient design elements of both gecko and mussel adhesives, provides a useful reversible attachment means for a variety of surfaces in many environments. "Single use" or single attachments also are contemplated.

The adhesive forces of the gecko have been observed to be on the order of 40 μN or more per seta[11, 12] and 10 nN per spatula.[13] Gecko adhesion has been explained as arising from weak secondary bond forces such as van der Waals.[11] However, adhesion of a single spatulae varies as a function of humidity and is dramatically reduced under water,[9, 10] suggesting some contribution from capillary forces. Contact mechanics arguments have been invoked to explain the subdivision of the setal contact surface into multiple independent nanosized spatulae, giving rise to enhancement of the mechanical behavior.[14] For the idealized case of a circular contact area, theory suggests that the adhesion strength scales as $\sqrt{n}$, where n is the number of independent contacts into which the area is subdivided. The contact splitting theory qualitatively explains the scaling of dry adhesive systems employed by some amphibians and insects, and provides guidance for development and optimization of synthetic gecko mimics.[6, 15, 16] Synthetic gecko adhesives that exhibit dry adhesion have been fabricated from polymers[2-4] as well as multiwalled carbon nanotubes.[5] However, maintenance of adhesion during repetitive contacts has only been demonstrated for a few contact cycles,[2, 8] and none have been shown to function under water or in high humidity environments.

A celebrated biological model for wet adhesion is the mussel, which is well known for its ability to cling to wet surfaces.[17, 18] Mussels secrete specialized adhesive proteins containing a high content of the catecholic amino acid 3,4-dihydroxy-L-phenylalanine (DOPA).[19-21] Both natural and synthetic adhesives containing DOPA and its derivatives have demonstrated strong interfacial adhesion strength.[22-25] Using single molecule measurements in aqueous media, we recently demonstrated that DOPA formed extraordinarily strong yet reversible bonds with surfaces.[26] In fact, the force necessary to dissociate DOPA from an oxide surface (~800 pN) was the highest ever observed for a reversible interaction between a small molecule and a surface.[26] It was theorized that the incorporation of mussel adhesive protein mimetic polymer onto a gecko-mimetic nanoadhesive structure would yield strong yet reversible wet/dry adhesion—a property that existing materials do not exhibit.

Figure 2:
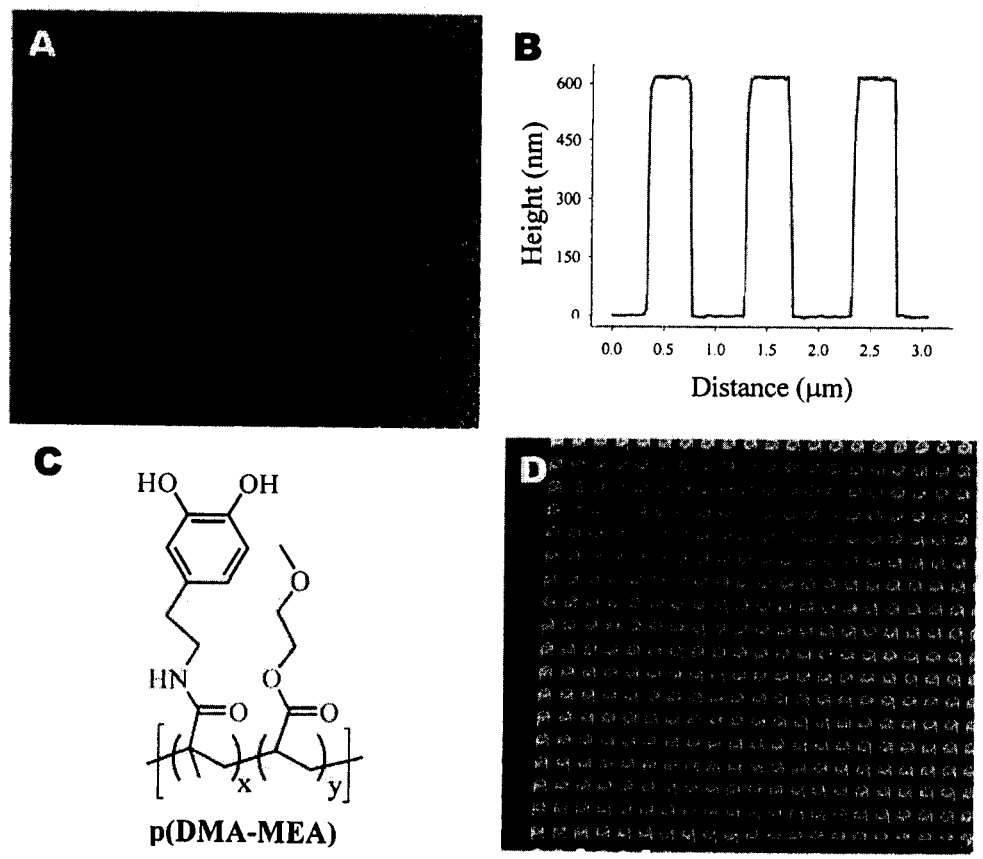
FIG. 2 Fabricated gecko and geckel adhesives. A. Scanning electron microscopy (SEM) image of eBL fabricated gecko nanopillar microarray, nanoarray, or simply or array (scale=10 μm). B. Atomic force microscopy (AFM) line scan of the gecko nanopillars. The height and diameter of the pillars (sometimes referred to as projections, nanopillars, microscale projections, supports, or microstructures) used in this study were 600 nm and 400 nm, respectively. The apparent widening of the pillars near the base is believed to be an artifact arising from the pyramidal shape of the AFM tip used for imaging. C. Chemical structure of the mussel adhesive protein mimetic polymer, p(DMA-co-MEA), which is applied to the surface of the gecko nanopillars. D. SEM image of geckel adhesive after coating the nanopillar array with p(DMA-co-MEA). The coating has little effect on the pillar geometry (scale=10 μm).

Arrays of gecko foot-mimetic nanoscale pillars coated with a thin MAP-mimetic polymer film are shown in FIG. 1. Designs of both the pillar array and the coating polymer were undertaken in view of current knowledge of the respective biological systems. For the pillar array, primary design criteria include the dimensions of the pillars and their spacing, as well as the stiffness of the pillar material.[15, 16] For flexibility in adapting to rough surfaces, both the supporting substrate and the pillar material were fabricated from poly(dimethylsiloxane) (PDMS) elastomer, which is a well-known organic material with a long history of use in microfabrication.[27] Arrays of PDMS pillars 200, 400, and 600 nm in diameter, 1-3 μm center-to-center distance, and 600-700 nm in height were successfully fabricated using e-beam lithography (eBL) (see FIG. 1). The pillar arrays are supported on a continuous film of PDMS 2-3 mm in thickness, with each PDMS pillar representing a single spatula found at the surface of a gecko foot (FIGS. 2A, B). Pillar arrays of 400 nm diameter and 600 nm height were tested for adhesion.

Figure 6:
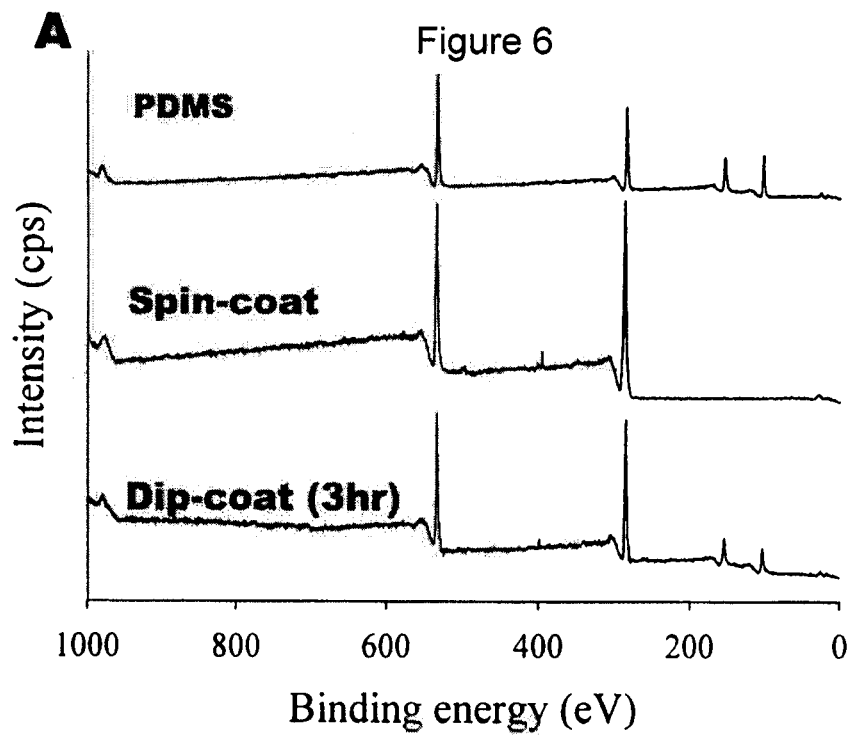
FIG. 6. X-ray photoelectron spectroscopy (XPS) of gecko and geckel adhesives. A. XPS was used to probe p(DMA)-co-MEA) coating thickness in a semi-quantitative way. Spin-coating p(DMA-co-MEA) onto PDMS resulted in no silicon signals (2 s, 153 eV and 2 p 103 eV) indicating that the coating thickness is more than the x-ray penetration depth, typically around 20 nm. Dipcoating resulted in both silicon and nitrogen signals, thus indicating that the coated polymer thickness is <20 nm. 6(B) Surface atomic composition of unmodified and modified PDMS substrates from the XPS data shown in 6(A). Dipcoated samples showed both silicon and nitrogen composition.

Analysis of mussel adhesive protein compositions gave insight into a rational design for a mussel-mimetic polymer. First, the synthetic polymer should have a high catechol content since DOPA accounts for as much as 27% of amino acids in the adhesive proteins found at the interface between mussel byssal pads and their substrate.[21] Second, long-lasting waterproof adhesion requires polymers with low water solubility to prevent their loss into the aqueous medium.[28] Poly(dopaminemethacrylamide-co-methoxyethylacrylate) (p(DMA-co-MEA), (FIG. 2C) was synthesized using free-radical polymerization where the adhesive monomer, DMA, accounts for 17% of this copolymer by weight ($^1$H NMR). p(DMA-co-MEA) has a high molecular weight and is insoluble in water.

p(DMA-co-MEA) was applied to the PDMS pillar array by dip coating in an ethanol solution of p(DMA-co-MEA). X-ray photoelectron spectroscopy (XPS) analysis of the coated substrate indicated a thin coating (<20 nm) as demonstrated by the presence of both silicon (103 eV, Si 2 p) from the PDMS and nitrogen (399 eV, N 1 s) from the p(DMA-co-MEA) (FIG. 6). Spin-coating p(DMA-co-MEA) onto PDMS resulted in no silicon signals (2 s, 153 eV and 2 p 103 eV) indicating that the coating thickness is more than the x-ray penetration depth, typically around 20 nm (FIG. 6A). Dip-coating resulted in both silicon and nitrogen signals, thus indicating that the coated polymer thickness is <20 nm. The surface atomic compositions of unmodified and dip-coated PDMS substrates are shown in FIG. 6B. Dip-coated sample showed both silicon and nitrogen compositions. A thin coating was desired for minimizing the change in pillar dimensions during coating, which was confirmed by scanning electron microscopy after coating with p(DMA-co-MEA) (FIG. 2D). We refer to the resulting flexible organic nanoadhesive as 'geckel', reflecting inspiration from both the gecko and the mussel.

Figure 3:
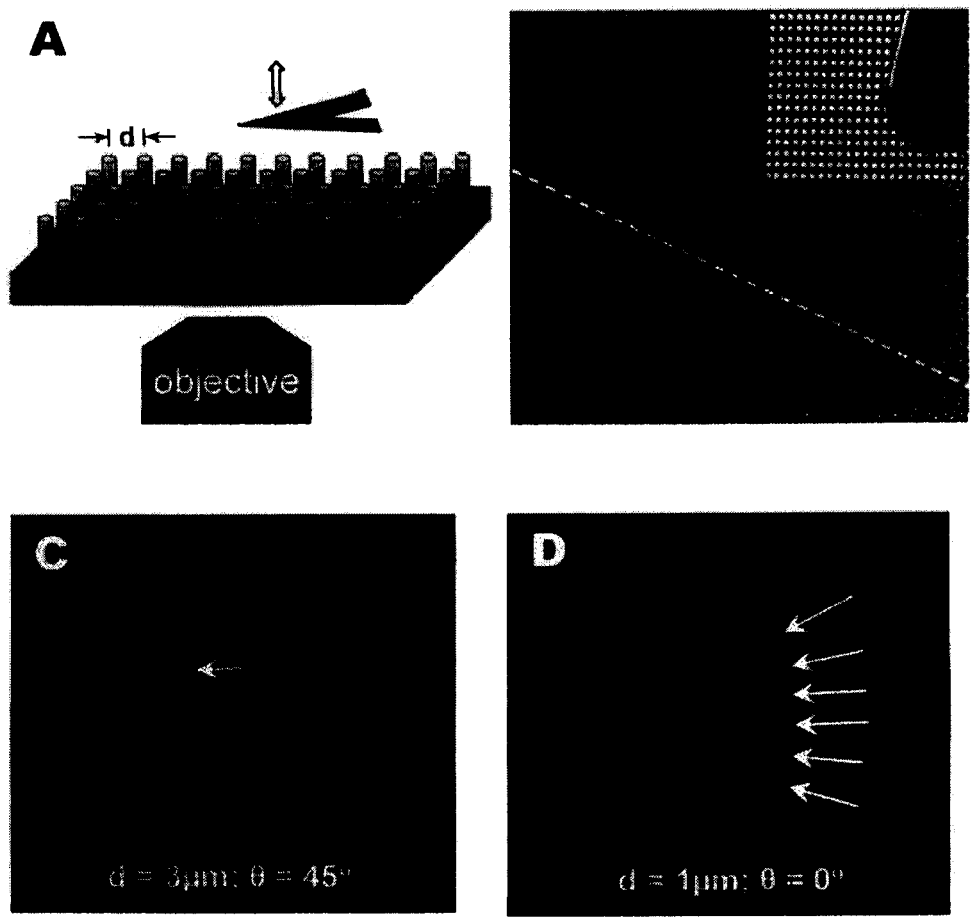
FIG. 3 AFM (atomic force microscopy) method for adhesion measurement and imaging of contact area at the single pillar level. A. Experimental set-up for measuring adhesion. A tipless AFM cantilever is brought into contact with the nanopillar array 3A) and then retracted while the contact area is imaged from an objective located the underneath adhesive film. B. The number of pillars contacting the cantilever was controlled through the distance, d, between pillars (d=1, 2, and 3 μm) and the angle, θ, between the cantilever and the axis of the pillar array (θ=either 0° or 45°). The inset shows an SEM image of a cantilever contacting a geckel pillar array to yield a five pillar contact condition (d=1 μm and θ=45°). C and D. Optical microscope images showing contact between AFM tip and pillar array. One pillar contact was achieved when d=3 μm and θ=45° (C), and six pillars were in contact when d=1 μm and θ=0°.

The performance of geckel adhesive was evaluated using an atomic force microscopy (AFM) system fully integrated with optical microscopy, which permitted simultaneous measurement of the adhesive contact force along with clear visualization of the nanoscale contact area down to the single pillar level. In a typical adhesion experiment (FIG. 3), the AFM piezo was used to bring a tipless cantilever ($Si_3N_4$) into contact with the geckel pillar array, and upon retraction the force necessary to separate the cantilever from the pillar array was measured. Furthermore, independently changing the spacing (d) between pillars (d=1, 2, and 3 μm; FIG. 3A) and the angle of orientation (θ) between the pillar array and the cantilever axis (FIG. 3B) allowed us to control the number of pillars contacting the cantilever precisely from one to six. For example, a geckel adhesive with d=3 μm and θ=45° resulted in a single pillar contact (FIG. 3C), whereas d=1 μm and θ=0° resulted in six pillars interacting with the cantilever simultaneously (FIG. 3D, movie 1).

Figure 4:
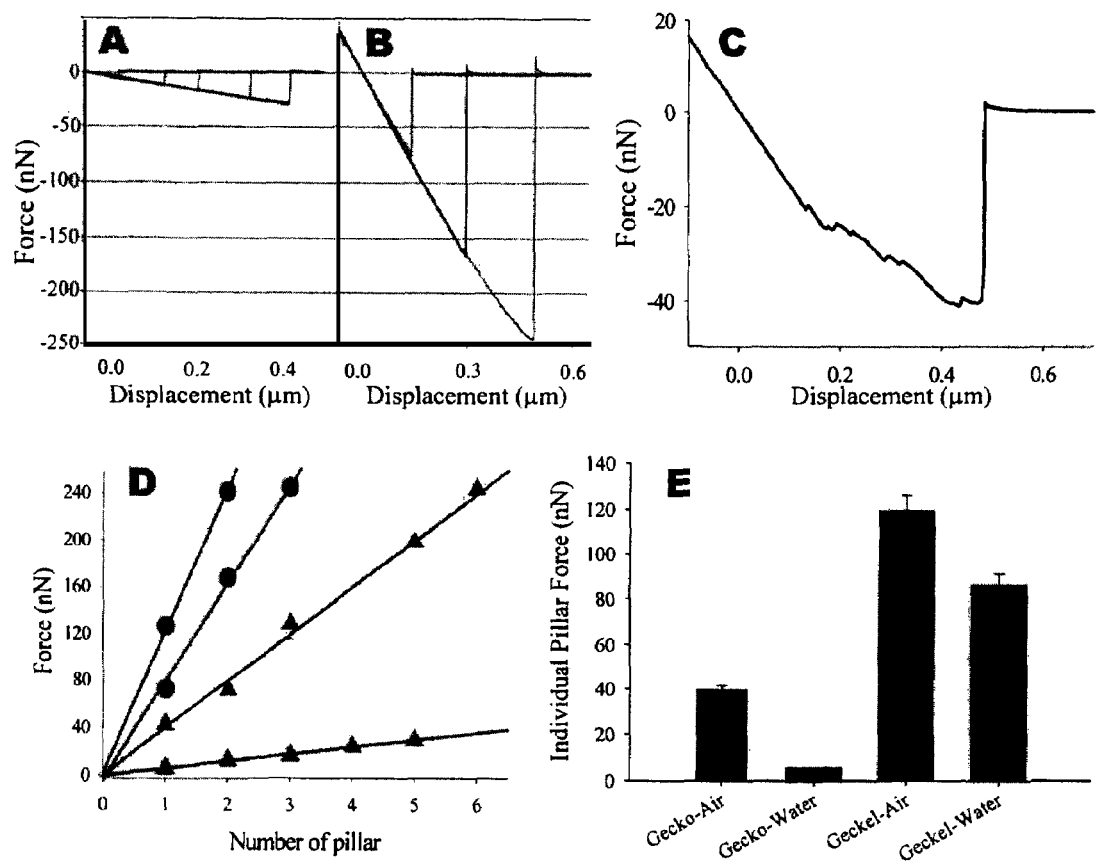
FIG. 4 Force-distance curves and adhesion strength of geckel adhesive. All data are for contact with a $Si_3N_4$ cantilever. A, B, Retraction force-distance curves for uncoated (A) and p(DMA-co-MEA) coated (B) pillars in water. Force-distance curves were obtained for contact with one (red), two (blue), three (green), four (pink), and five (black) pillars. C, Retraction force-distance curve for contact between cantilever and flat p(DMA-co-MEA)-coated PDMS (contact area=55.3 μm$^2$). D, Mean separation force values versus number of pillars for gecko (triangle) and geckel (circle) in water (red) and air (black) (n>60, for each data point). E, Adhesion force per pillar, obtained from the slopes of the regression lines shown in D. Wet adhesion was increased 15-fold in water. Error bars represent standard deviation.

Adhesion experiments were performed both in air and under water for uncoated (hereafter 'gecko') and p(DMA-co-MEA) coated ('geckel') pillar arrays (FIG. 4). Pillar-resolved (i.e. area-defined) force measurements showed strong adhesive forces when the cantilever was pulled away from the pillar surface. FIGS. 4A and 4B show typical force-distance (F-D) curves, with each curve representing a specific number (1-6) of 400 nm diameter pillars interacting with the $Si_3N_4$ cantilever surface. The pull-off force was determined from each F-D curve, and mean values from multiple experiments were plotted in FIG. 4D as a function of the number of contacting pillars. The observed linear increase in force with pillar number indicates constructive force accumulation, i.e. simultaneous detachment of individual pillars from the cantilever. The adhesive force per pillar (nN/pillar) was calculated from the individual slopes (FIG. 4E): 39.8±2 (gecko in air), 5.9±0.2 (gecko in water), 120±6 (geckel in air), and 86.3±5 (geckel in water).

Figure 7:
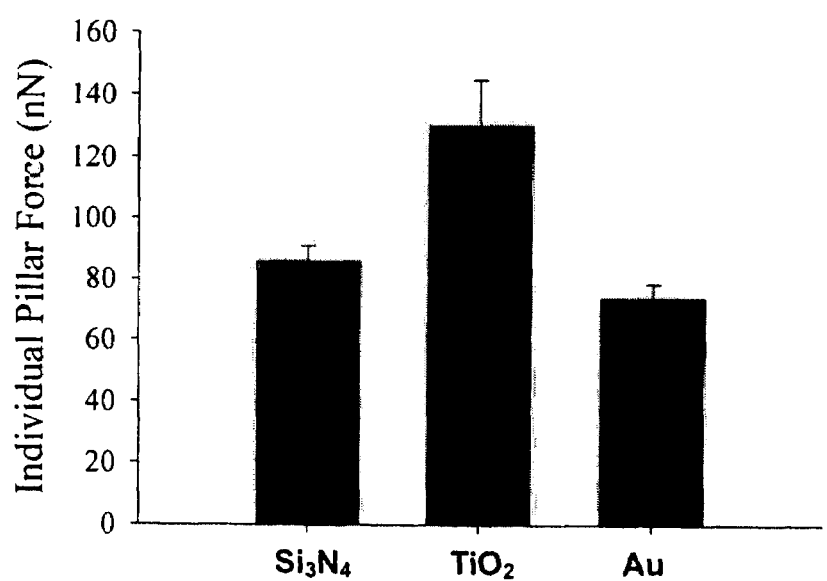
FIG. 7. Substrate-dependent wet adhesion of geckel. AFM force measurements revealed changes in wet adhesion of the geckel adhesive on different substrates ($Si_3N_4$, $TiO_x$, and Au.) 86.3±5 nN for $Si_3N_4$ (the data from FIG. 4D, Geckel-Water), 130.7±14.3 nN for $TiO_x$ (n=50), and 74.3±4.1 nN for Au (n=65).

Although the addition of p(DMA-co-MEA) coating on the pillars significantly increased dry adhesion, the enhancement of wet adhesion was particularly dramatic, as the wet adhesive force per pillar increased nearly 15 times (5.9→86.3 nN/pillar, $Si_3N_4$) when coated with p(DMA-co-MEA). The geckel wet-adhesion strength was also high when tested against other surfaces: titanium oxide (130.7±14.3 nN/pillar) and gold (74.3±4.1 nN/pillar) (FIG. 7). The versatility of geckel is not surprising given recent single molecule force experiments showing the ability of DOPA to interact strongly with both organic and inorganic surfaces.[26] These interactions can take many forms, including metal coordination bonds, pi electron interactions, and covalent bonds. The lower adhesion strength of geckel on gold is in qualitative agreement with our earlier single molecule pull-off and polymer adsorption studies that indicated DOPA interacts less strongly with gold than with titanium oxide.[26-29]

Figure 5:
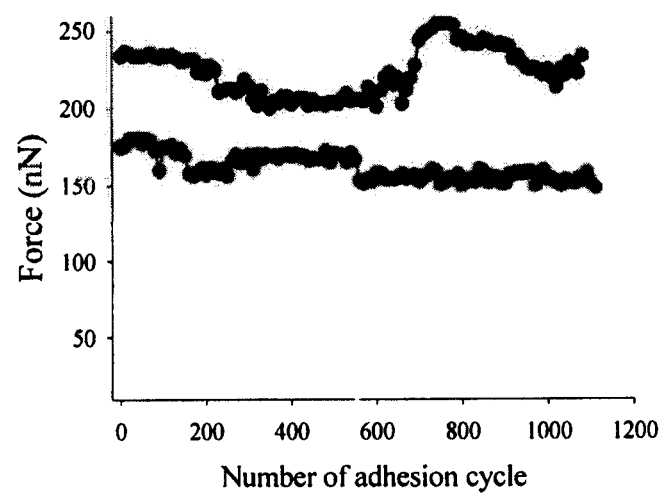
FIG. 5. Long-term performance of geckel adhesive. Multiple cycles of attachment and detachment of geckel adhesive were performed in water (red) and air (black). Adhesion strength decreased by only 15% in water (red) and 2% in air (black) after 1100 successive cycles of contact and separation (two-pillar contact).
Figure 8:
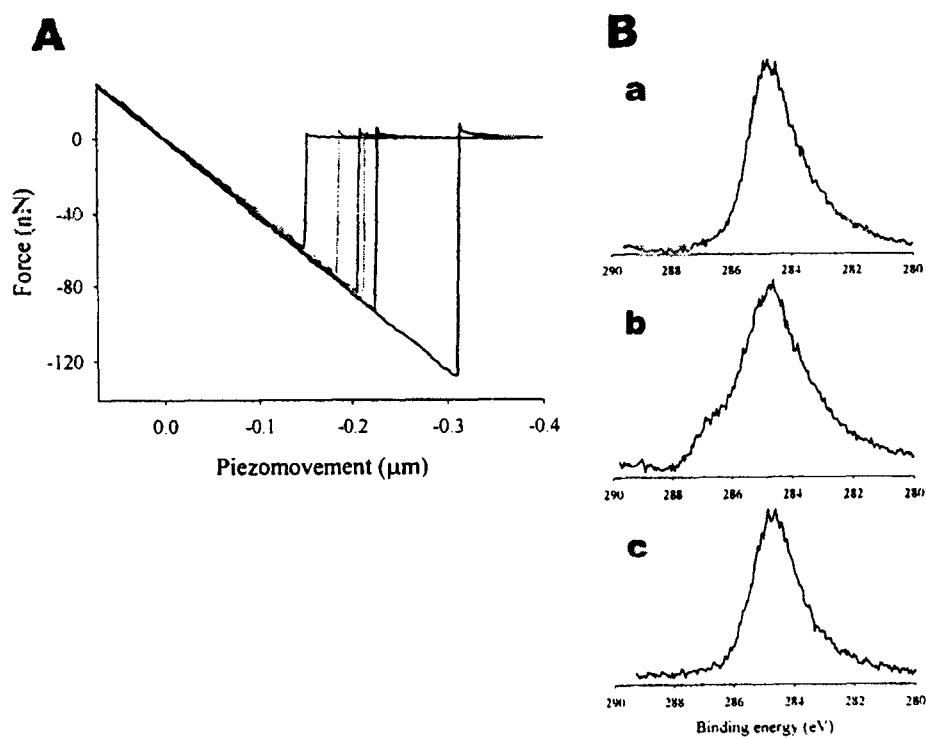
FIG. 8. Wet adhesion of p(MEA)-coated gecko. (A) Adhesion of a p(MEA)-coated pillar array to $Si_3N_4$ in water (5 pillar contact, 400 nm pillar diameter, d=1 μm and θ=45°). A significant decay in adhesion was observed with successive contacts. The force traces shown in the figure represent every $10^{th}$ cycle: 1(127.9 nN, black); 11(93.8 nN, blue), 21(86.6 nN, green), 31(82.7 nN, pink), 41(73.1 nN, orange), and 51(59.3 nN, red). (B) Carbon 1s high resolution XPS spectra of bare PDMS (panel a), p(MEA)-coated PDMS (panel b), and p(MEA)-PDMS after incubation in water at room temperature for 18 hrs (panel c).

The ability of the bond between DOPA and a metal oxide surface to rupture upon pulling, and then re-form when brought back into contact with the surface,[26] is an important aspect of this invention. Repetitive AFM measurements showed that geckel adhesive's wet- and dry-adhesion power was only slightly diminished during many cycles of adhesion, maintaining 85% in wet (red) and 98% in dry (black) conditions after 1100 contact cycles (FIG. 5). To our knowledge no other gecko-mimetic adhesive has demonstrated efficacy for more than a few contact cycles,[2, 8] and none have been shown to work under water. This surprising and unexpected advantage of the present invention suggests many possible applications. Control experiments involving pillar arrays coated with catechol-free polymer, p(MEA), showed lower adhesion strength (26 nN/pillar for the first contact cycle) as well as rapid decay in the adhesion performance under cyclic testing occurred over 5 adhesive contacts (FIG. 8A). From XPS spectra shown in FIG. 8B, carbonyl peak for the p(MEA)-coated surface disappeared over 18 hours of incubation suggesting the detachment of the polymer. Although repeatable adhesion can be achieved underwater using a DHPD-free polymer, the adhesive performance is significantly reduced emphasizing the importance of the mussel-mimetic catechol groups in enhancing wet adhesion as well as anchoring the p(DMA-co-MEA) polymer to the pillar array. At the same time, it appears that the nanostructured surface is essential to the observed geckel adhesive behavior. Force measurements on flat substrates coated with p(DMA-co-MEA) indicated a complex peeling behavior initiating at low adhesive strength (FIG. 4C), which is in distinct contrast to the linear force accumulation behavior exhibited by the geckel adhesive (FIG. 4D).

The geckel nanoadhesive was shown to be highly effective at adhering reversibly to surfaces under water, and with functional performance resembling that of a sticky note. Although we must be cautious in extrapolating our results to larger areas because of the challenges associated with maintaining equal load sharing among a large number of pillars, in its current form (400 nm pillar diameter and 1 μm spacing) a 1 $cm^2$ surface area of geckel adhesive would transmit 9 N of force under water (90 kPa). It is interesting to note that this value is similar to estimates for the strength of gecko dry adhesion,[9, 11, 12] suggesting that under wet conditions our hybrid geckel adhesive may perform as well as gecko adhesives do under dry conditions. Further refinement of the pillar geometry and spacing, the pillar material, and mussel mimetic polymer may lead to even greater improvements in performance of this nanostructured adhesive. We believe geckel type adhesives will prove useful in a great variety of medical, industrial, consumer and military settings.

EXAMPLE 1

Preparation of PDMS Nanoscaled Arrays Coated with p(DMA-co-MEA)

For the fabrication of gecko-mimetic adhesive arrays, e-beam lithography was used to create a pattern of holes in a PMMA film supported on a silicon wafer (negative mold). Solid phase PDMS was then cast onto the negative mold, thermally solidified, and then lifted off from the substrate to yield a positive array of PDMS pillars (~400 nm in diameter and 600 nm in height) supported on by a continuous PDMS film. Mussel-mimetic polymer, p(DMA-co-MEA), was synthesized by radical copolymerization of dopamine methacrylamide (DMA) and methoxyethylacrylate (MEA) monomers. Finally, the geckel adhesive was prepared by dip-coating PDMS pillar arrays into an ethanol solution of p(DMA-co-MEA) for 3 hrs. Surface chemical compositions were analyzed by X-ray photoelectron spectroscopy (XPS) and time-of-flight secondary ion mass spectrometry (ToF-SIMS). Pillar arrays were imaged by AFM and scanning electron microscopy (SEM). Adhesive forces under dry and wet conditions were determined by AFM equipped with tipless cantilevers. The contact area between tip and the pillar array was precisely controlled by the distance between pillars (d=1, 2, and 3 μm) and the angle between cantilever and pillar axis (θ), and was determined by optical imaging using a 40× objective and fiber-optic illumination.

EXAMPLE 2

Synthesis of Dopamine Methacrylamide (DMA)

20 g of sodium borate and 8 g of $NaHCO_3$ were dissolved in 200 mL of deionized water and bubbled with Ar for 20 min. 10 g of dopamine-HCl (52.8 mmol) was then added followed by the dropwise addition of 9.4 mL of methacrylate anhydride (58.1 mmol) in 50 mL of THF, during which the pH of solution was kept above 8 with addition of 1N NaOH as necessary. The reaction mixture was stirred overnight at room temperature with Ar bubbling. The aqueous mixture was washed twice with 100 mL of ethyl acetate two times and then the pH of the aqueous solution was reduced to less than 2 and the solution extracted with 100 mL of ethyl acetate 3 times. The final three washes were combined and dried over $MgSO_4$ to reduce the volume to around 50 mL. 450 mL of Hexane was added with vigorous stirring and the suspension was held at 4° C. overnight. The product was recrystallized from hexane and dried to yield 9.1 g of grey solid. $^1H$ NMR (400 MHz, DMSO-d/TMS): δ 6.64–6.57 (m, 2H, $C_6HH_2(OH)_2$—), 6.42 (d, 1H, $C_6H_2H(OH)_2$—), 5.61 (s, 1H, —C(=O)—C(—$CH_3$)=CHH), 5.30 (s, 1H, —C(=O)—C(—$CH_3$)=CHH), 3.21 (m, 2H, $C_6H_3(OH)_2$—$CH_2$—$CH_2$(NH)—C(=O)—), 2.55 (t, 2H, $C_6H_3(OH)_2$—$CH_2$—$CH_2$(NH)—C(=O)—), 1.84 (s, 3H, —C(=O)—C(—$CH_3$)=$CH_2$). $^{13}C$ NMR (400 MHz, DMSO-d/TMS): δ167.3 (s, 1C, —NH—C(=O)—C($CH_3$)=$CH_2$), 145.0 (s, 1C, —NH—C(=O)—C($CH_3$)=$CH_2$), 143.5–115.5 (6C, $C_6H_3(0$—C(=O)—$CH_3)_2$), 130.3 (s, 1C, —NH—C(=O)—C($CH_3$)=$CH_2$), 41.0 (s, 1C, $C_6H_3(OH)_2$—$CH_2$—$CH_2$(NH)—C(=O)—), 34.6 (s, 1C, $C_6H_3(OH)_2$—$CH_2$—$CH_2$(NH)—C(=O)—), 18.7 (s, 1C, —C(=O)—C(—$CH_3$)=$CH_2$).

EXAMPLE 3

Synthesis of p(DMA-co-MEA)

12.5 mL of MEA was passed through a column packed with 30 g of $Al_2O_3$ to remove inhibitors. 7.5 g of purified MEA (57.9 mmol), 1.7 g of DMA (7.4 mmol), and 106 mg of AIBN (0.64 mmol) were added to 20 mL of DMF in an AirFree® flask. The solution mixture was degassed through pump-freeze-thaw cycles 3 times. While sealed under vacuum, the solution was heated to 60° C. and stirred overnight. The reaction mixture was diluted with 50 mL of methanol and added to 400 mL of $Et_2O$ to precipitate the polymer. After precipitating in DCM/ethyl ether two more times and drying in a vacuum desicator, 5.7 g of white, sticky solid was obtained. $^1H$ NMR (400 MHz, $CDCl_3$/TMS): δ6.81–6.70 (d, br, 2H, $C_6HH_2(OH)_2$—), 6.58 (s, br, 1H, $C_6H_2H(OH)_2$—), 4.20 (s, br, 2H, $CH_3$—O—$CH_2$—$CH_2$—O—C(=O)—), 3.57 (s, br, 2H, $CH_3$—O—$CH_2$—$CH_2$—O—C(=O)—), 3.36 (s, br, 3H, $CH_3$—O—$CH_2$—$CH_2$—O—C(=O)—), 2.69 (s, br, 2H, $C_6H_3(OH)_2$—$CH_2$—$CH_2$(NH)—C(=O)—), 2.39 (s, br, 1H, —O—C(=O)—CH($CH_2$—)—$CH_2$—), 2.14

(s, br, 2H, $C_6H_3(OH)_2$—$CH_2$—$CH_2(NH)$—$C(=O)$—), 1.93 (s, 3H, —NH—$C(=O)$—$C(CH_3)(CH_2$—)—$CH_2$—), 1.68 (m, br, —O—$C(=O)$—$CH(CH_2$—)—$CH_2$—), 0.98 (m, br, —NH—$C(=O)$—$C(CH_3)(CH_2$—)—$CH_2$—). GPC-MALLS (Wyatt Technology, Santa Barbara, Calif. with mobile phase of 20 mM LiBr in DMF and Shodex-OH Pak columns): $\overline{M}_n$=252 kDa, PD=1.73. For control experiments, a catechol-free p(MEA) homopolymer ($\overline{M}_w$=100 kDa, Scientific Polymer Products, Ontario, N.Y.) was used.

EXAMPLE 4 e-beam Lithography e-beam resist (950PMMA A3, MicroChem) was spin-coated (4000 rpm, 40 sec) on silicon wafer several times until the resist thickness, as measured by ellipsometry (Woolam Co. Lincoln, Nebr.), reached 600~700 nm. The resist was patterned at 30 kV with an area dose between 650-800 $\mu C/cm^2$ using Quanta 600F (FEI Co. Hillsboro, Oreg.). Resist development was performed for 1 min with a solution of methyl isobutyl ketone/isopropanol (⅓, v/v), followed by rinsing with water. The patterned substrates were treated with oxygen plasma (Harrick, Pleasantville, N.Y.) for 30 sec and repeated 2-3 times to completely remove residual resist from the exposed Si regions. The patterned substrates were then exposed to a triethoxyoctylsilane vapor for 30 min. PDMS was prepared as follows: 4 μL of Pt-catalyst (platinum-divinyl tetramethyl-disiloxane in xylene) and 4 μL of modulator (2,4,6,8-tetramethyl-2,4,6,8-tetravinylcyclotetrasioxane) were added to a 7-8% vinylmethylsiloxane solution (3.5 g). The solution was subsequently mixed with a 25-30% methylhydrosiloxane (1 g) solution. Finally the solution was cured (80° C.) after spin-coating (1000 rpm for 1 min) onto the PMMA/Si master. The spin-coated substrate was covered either by thin cover glass for force measurements or sylgard-184 PDMS for other experiments such as optical imaging or x-ray photoelectron spectroscopy (XPS). Gecko adhesive was obtained by PDMS pattern lift-off and brief exposure to oxygen plasma (100 W, 30 sec) and used within 2-3 hrs after plasma treatment. Geckel adhesive was prepared by dip-coating gecko adhesive in a 1 mg/mL solution of p(DMA-co-MEA) in ethanol at 70° C. Unstructured controls were fabricated in the same manner using flat PDMS.

EXAMPLE 5

X-ray Photoelectron Spectroscopy

The presence of p(DMA-co-MEA) and p(MEA) on PDMS surfaces was confirmed by x-ray photoelectron spectroscopy (XPS) (Omicron, Taunusstein Germany) equipped with a monochromatic Al Kα (1486.8 eV) 300 W x-ray source and an electron gun to eliminate charge build-up.

EXAMPLE 6

Atomic Force and Optical Microscopy

All force data were collected on an Asylum Mfp-1D AFM instrument (Asylum Research, Santa Barbara, Calif.) installed on a Nikon TE2000 microscope. Spring constants of individual cantilevers (Veecoprobes, NP-20 tipless $Si_3N_4$ tips, Santa Barbara, Calif.) were calibrated by applying the equipartition theorem to the thermal noise spectrum.[30] Due to the large forces exhibited by the adhesive, only tips exhibiting high spring constants (280-370 pN/nm) were used. Metal and metal oxide coated cantilevers were formed by sputter coating ~10 nm of Au or Ti (a native oxide formed at the Ti surface, $TiO_x$) using a Denton Vacuum Desk III (Moorestown, N.J.). The surface composition of each cantilever was confirmed by time-of-flight secondary ion mass spectrometry (ToF-SIMS), using a PHI-TRIFT III (Ga$^+$, 15 keV, Physical Electronics, Eden Prairie, Minn.). Cantilevers were treated by oxygen plasma (100 W, 150 mTorr) for 3 min before use. Force measurements were conducted either in deionized water or ambient (air) conditions at a cantilever pulling speed of 2 μm/sec. In wet experiments, optical microscopic examination of the contact region indicated the absence of air bubbles trapped between nanopillars and on the nanopillar surface (not shown). Tapping mode AFM images were obtained using a multimode Veeco Digital Instrument (San Diego, Calif.) with a Si cantilever (resonance frequency of 230-280 kHz). Contact area was imaged by an inverted optical microscope using a 40× objective illuminated by a fiber-optic white light source perpendicular to the objective.

The following list of references, including the references themselves, is incorporated by reference herein.

REFERENCES

1. Ruibal, R. & Ernst, V. The structure of the digital setae of lizards. *J. Morphology* 117, 271-293 (1965).
2. Geim, A. K. et al. Microfabricated adhesive mimicking gecko foot-hair. *Nat. Materials* 2, 461-463 (2003).
3. Northen, M. T. & Turner, K. L. A batch fabricated biomimetic dry adhesive. *Nanotechnology* 16, 1159-1166 (2005).
4. Sitti, M. & Fearing, R. Synthetic gecko foot-hair micro/nano-structures as dry adhesives. *J. Adhes. Sci. Technol.* 17, 1055-1073 (2003).
5. Yurdumakan, B., Raravikar, N. R., Ajayan, P. M. & Dhinojwala, A. Synthetic gecko foot-hairs from multiwalled carbon nanotubes. *Chem. Commun.* 30, 3799-3801 (2005).
6. Peressadko, A. & Gorb, S. N. When less is more: Experimental evidence for tenacity enhancement by division of contact area. *J. Adhesion* 80, 1-5 (2004).
7. Crosby, A. J., Hageman, M. & Duncan, A. Controlling polymer adhesion with "Pancakes". *Langmuir* 21, 11738-11743 (2005).
8. Northen, M. T. & Turner, K. L. Meso-scale adhesion testing of integrated micro- and nano-scale structures. *Sensors and Actuators A* 130-131, 583-587 (2006).
9. Huber, G et al. Evidence for capillary contributions to gecko adhesion from single spatula nanomechanical measurements. *Proc. Nat. Acad. Sci. USA* 102, 16293-16296 (2005).
10. Sun, W., Neuzil, P., Kustandi, T. S., Oh, S. & Samper, V. D. The nature of the gecko lizard adhesive force. *Biophys. J.* 89, L14-16 (2005).
11. Autumn, K. et al. Evidence for van der Waals adhesion in gecko setae. *Proc. Nat. Acad. Sci. USA* 99, 12252-12256 (2002).
12. Autumn, K. et al. Adhesive force of a single gecko foothair. *Nature* 405, 681-685 (2000).
13. Huber, G., Gorb, S. N., Spolenak, R. & Arzt, E. Resolving the nanoscale adhesion of individual gecko spatulae by atomic force microscopy. *Biology Lett.* 1, 2 (2005).
14. Arzt, E., Gorb, S. & Spolenak, R. From micro to nano contacts in biological attachment devices. *Proc. Nat. Acad. Sci. USA* 100, 10603-10606 (2003).

15. Arzt, E. Biological and artificial attachment devices: Lessons for materials scientists from flies and geckos. *Materials Sci. and Eng. C: Biomimetic and Supramol. Systems* 26, 1245-1250 (2006).
16. Spolenak, R., Gorb, S. & Arzt, E. Adhesion design maps for bio-inspired attachment systems. *Acta biomaterialia* 1, 5-13 (2005).
17. Waite, J. H. Nature's underwater adhesive specialist. *Chemtech* 17, 692-697 (1987).
18. Waite, J. H. Adhesion a la moule. *Integ. and Comp. Biol.* 42, 1172-1180 (2002).
19. Waite, J. H. & Tanzer, M. L. Polyphenolic substance of mytilus edulis: novel adhesive containing L-Dopa and hydroxyproline. *Science* 212, 1038-1040 (1981).
20. Papov, V. V, Diamond, T. V., Biemann, K. & Waite, J. H. Hydroxyarginine-containing polyphenolic proteins in the adhesive plaques of the marine mussel Mytilus edulis. *J. Biol. Chem.* 270, 20183-92 (1995).
21. Waite, J. H. & Qin, X. X. Polyphenolic phosphoprotein from the adhesive pads of the common mussel. *Biochemistry* 40, 2887-2893 (2001).
22. Yu, M. & Deming, T. J. Synthetic polypeptide mimics of marine adhesives. *Macromolecules* 31, 4739-4745 (1998).
23. Frank, B. P. & Belfort, G Adhesion of Mytilus edulis Foot Protein 1 on Silica: Ionic Effects on Biofouling. *Biotech. Prog.* 18, 580-586 (2002).
24. Hwang, D. S., Yoo, H. J., Jun, J. H., Moon, W. K. & Cha, H. J. Expression of functional recombinant mussel adhesive protein Mgfp-5 in *Escherichia coli*. *Appl. Environ. Microbiol.* 70, 3352-9 (2004).
25. Lee, B. et al. Rapid Gel Formation and Adhesion in Photocurable and Biodegradable Block Copolymers with High DOPA Content. *Macromolecules* 39, 1740-1748 (2006).
26. Lee, H., Scherer, N. F. & Messersmith, P. B. Single molecule mechanics of mussel adhesion. *Proc. Nat. Acad. Sci. USA* 103, 12999-13003 (2006).
27. Whitesides, G. M. The origins and the future of microfluidics. *Nature* 442, 368-373 (2006).
28. Waite, J. H., Andersen, N. H., Jewhurst, S. & Sun, C. Mussel adhesion: finding the tricks worth mimicking. *J. Adhesion* 81, 1-21 (2005).
29. Dalsin, D. L., Hu, B.-H., Lee, B. P. & Messersmith, P. B. Mussel adhesive protein mimetic polymers for the preparation of nonfouling surfaces. *J. Am. Chem. Soc.* 125, 4253-4258 (2003).
30. Hutter, J. L. & Bechhoefer, J. Calibration of atomic-force microscope tips. *Rev. Sci. Instr.* 64, 1868-1873 (1993).

What is claimed is:

1. An array of microstructures, the array comprising a substrate comprised of an elastomeric polymer having a plurality of upstanding or pending substantially columnar microscale projections that are integral to the substrate, the projections having a separate renewable adhesive coating comprising an ortho-dihydroxyphenyl derivative disposed on a working surface thereof, and wherein adjacent microscale projections are from 1-3 micrometers apart, as measured from center to center.

2. An array of microstructures, the array comprising a substrate comprised of a elastomeric polymer, the substrate having a plurality of substantially columnar microscale projections that are integral to the substrate, the projections having a separate renewable adhesive coating comprising a dihydroxyphenyl polymer disposed on a working surface thereof, and wherein adjacent microscale projections are from 1-3 micrometers apart, as measured from center to center.

3. A method comprising the steps of:
providing an array of microstructures, the array comprising a substrate comprised of an elastomeric polymer having a plurality of upstanding or pending substantially columnar microscale projections that are integral to the substrate, the projections having a separate renewable adhesive coating comprising an ortho-dihydroxyphenyl derivative disposed on a working surface thereof, and wherein adjacent microscale projections are from 1-3 micrometers apart, as measured from center to center;
adhering the array of microstructures to a surface with the ortho-dihydroxyphenyl derivative layer being disposed between the surface and the substrate;
detaching the array from the surface, the ortho-dihydroxyphenyl derivative layer adhering to the array; and
adhering the array to a second surface.

4. A method according to claim 3 wherein the array has dihydroxyphenyl polymer on a working surface thereof.

5. A microarray comprising a substrate comprised of an elastomeric polymer having a plurality of substantially columnar microscale projections that are integral to the substrate, the microscale projections having a separate renewable adhesive dihydroxyphenyl polymer coating disposed on a working surface thereof, wherein adjacent microscale projections are from 1-3 micrometers apart, as measured from center to center.

6. A method of making an array of microstructures comprising the steps of:
providing a substrate comprised of an elastomeric polymer having a plurality of upstanding or pending substantially columnar microscale projections that are integral to the substrate, wherein adjacent microscale projections are from 1-3 micrometers apart, as measured from center to center; and
applying a separate renewable adhesive coating comprising an ortho-dihydroxyphenyl derivative to at least a portion of the microscale projections.

7. A method according to claim 6 wherein the applying step is accomplished by dip coating the array.

8. A method according to claim 7 wherein the applying step is accomplished by spin-coating the array.

9. The array of claim 2, wherein the dihydroxyphenyl polymer is acrylate-based.

10. The array of claim 9, wherein the dihydroxyphenyl polymer comprises dopamine methacrylamide and methoxyethylacrylate.

11. The array of claim 10, wherein the dihydroxyphenyl polymer has the chemical structure:

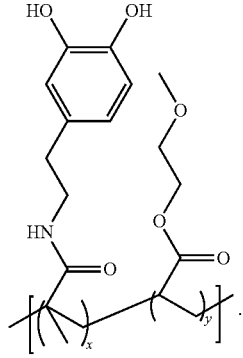

* * * * *

UNITED STATES PATENT AND TRADEMARK OFFICE
CERTIFICATE OF CORRECTION

PATENT NO.        : 8,563,117 B2
APPLICATION NO.   : 11/834631
DATED             : October 22, 2013
INVENTOR(S)       : Phillip B. Messersmith, Haeshin Lee and Bruce P. Lee It is certified that error appears in the above-identified patent and that said Letters Patent is hereby corrected as shown below:

On the Title Page, (73) Assignee, the following should be added

-- Northwestern University; Evanston, IL and Kensey Nash Corporation; Exton, PA --

Signed and Sealed this
Twenty-sixth Day of May, 2015

Michelle K. Lee
*Director of the United States Patent and Trademark Office*